United States Patent
Vermani et al.

(10) Patent No.: US 11,984,976 B2
(45) Date of Patent: May 14, 2024

(54) INTERPRETATION OF RESERVED STATES IN WIRELESS PACKETS

(71) Applicant: QUALCOMM Incorporated, San Diego, CA (US)

(72) Inventors: Sameer Vermani, San Diego, CA (US); Bin Tian, San Diego, CA (US); Youhan Kim, Saratoga, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/513,849

(22) Filed: Oct. 28, 2021

(65) Prior Publication Data

US 2022/0140942 A1 May 5, 2022

Related U.S. Application Data

(60) Provisional application No. 63/108,250, filed on Oct. 30, 2020.

(51) Int. Cl.
*H04W 4/00* (2018.01)
*H04L 1/00* (2006.01)
*H04W 80/02* (2009.01)

(52) U.S. Cl.
CPC .......... *H04L 1/0036* (2013.01); *H04L 1/0013* (2013.01); *H04W 80/02* (2013.01)

(58) Field of Classification Search
CPC . H04L 1/0036; H04L 1/0013; H04L 27/2602; H04L 27/2603; H04L 5/0053; H04W 80/02
See application file for complete search history.

(56) References Cited

U.S. PATENT DOCUMENTS

2007/0160021 A1\* 7/2007 Xhafa ................ H04W 74/002
370/338
2008/0181156 A1 7/2008 Ecclesine
(Continued)

OTHER PUBLICATIONS

International Search Report and Written Opinion—PCT/US2021/057242—ISA/EPO—dated Feb. 18, 2022.
(Continued)

*Primary Examiner* — Atique Ahmed
(74) *Attorney, Agent, or Firm* — Kevin M. Donnelly; Holland & Hart LLP

(57) ABSTRACT

This disclosure provides methods, devices and systems for interpreting reserved bits and values associated with different releases of a wireless communication protocol. In some implementations, a wireless communication device may determine whether to terminate or continue reception of a physical layer protocol convergence protocol (PLCP) protocol data unit (PPDU) if it detects a reserved bit in the physical layer preamble set to an unsupported value (such as a value different than what is defined by a version or release of the wireless communication protocol supported by the wireless communication device). In some other implementations, a wireless communication device may determine whether to terminate or continue reception of a PPDU if it detects a field in the physical layer preamble set to a reserved value (such as defined by a version or release of the wireless communication protocol supported by the wireless communication device).

30 Claims, 14 Drawing Sheets

(56) References Cited

U.S. PATENT DOCUMENTS

| | | | |
|---|---|---|---|
| 2011/0032875 A1* | 2/2011 | Erceg | H04L 5/005 |
| | | | 370/328 |
| 2017/0111196 A1* | 4/2017 | Su | H04L 27/2602 |
| 2017/0181136 A1* | 6/2017 | Bharadwaj | H04W 72/12 |
| 2017/0311289 A1* | 10/2017 | Kim | H04W 74/0816 |
| 2018/0048427 A1* | 2/2018 | Lou | H04L 1/18 |
| 2018/0146426 A1 | 5/2018 | Park | |
| 2018/0212738 A1* | 7/2018 | Chun | H04L 1/1685 |
| 2018/0287755 A1* | 10/2018 | Lim | H04L 27/2602 |
| 2019/0238301 A1* | 8/2019 | Verma | H04L 5/0046 |
| 2020/0136884 A1* | 4/2020 | Park | H04L 27/2665 |
| 2020/0221292 A1* | 7/2020 | Li | H04W 8/26 |
| 2021/0014788 A1* | 1/2021 | Sahin | H04L 27/04 |
| 2021/0058971 A1 | 2/2021 | Molavianjazi et al. | |
| 2021/0212035 A1* | 7/2021 | Son | H04H 20/95 |
| 2021/0321410 A1 | 10/2021 | Patil et al. | |
| 2021/0377971 A1 | 12/2021 | Park et al. | |

OTHER PUBLICATIONS

Sun L-H (Interdigital)., et al., "Preamble Design Consideration for 11be Follow-Up", IEEE Draft, 11-19-1569-00-00BE-PREAMBLE-DESIGN-CONSIDERATION-FOR-11BE-FOLLOW-UP, IEEE-SA Mentor, Piscataway, NJ USA vol. 802.11 EHT, 802.11be, Sep. 15, 2019 (Sep. 15, 2019), pp. 1-10, XP068153694, Retrieved from the Internet: URL:https://mentor.ieee.org/802.11/dcn/19/11-19-1569-00-00be-preamble-design-consideration-for-11be-follow-up.pptx [retrieved on Sep. 15, 2019] p. 4-p. 7.

Vermani S (Qualcomm)., et al., "Open Issues on Preamble Design", IEEE Draft, 11-20-1238-03-00BE-OPEN-ISSUES-ON-PREAMBLE-DESIGN, IEEE-SA Mentor, Piscataway, NJ USA vol. 802.11 EHT, 802.11be, No. 3, Sep. 21, 2020 (Sep. 21, 2020), pp. 1-33, XP068173439, Retrieved from the Internet: URL:https://mentor.ieee.org/802.11/dcn/20/11-20-1238-03-00be-open-issues-on-preamble-design.pptx [retrieved on Sep. 21, 2020] the whole document.

\* cited by examiner

INTERPRETATION OF RESERVED STATES IN WIRELESS PACKETS

CROSS-REFERENCE TO RELATED APPLICATIONS

This Patent Application claims priority to U.S. Provisional Patent Application No. 63/108,250 entitled "INTERPRETATION OF RESERVED STATES IN WIRELESS PACKETS" and filed on Oct. 30, 2020, which is assigned to the assignee hereof. The disclosures of all prior Applications are considered part of and are incorporated by reference in this Patent Application.

TECHNICAL FIELD

This disclosure relates generally to wireless communication, and more specifically to interpreting reserved states in wireless packets.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Existing versions of the IEEE 802.11 standard define various physical layer convergence protocol (PLCP) data unit (PPDU) formats for wireless packets transmitted between APs and STAs. Each PPDU format generally includes a physical layer preamble followed by a data portion (if applicable). The preamble includes a number of fields that carry information necessary for interpreting or receiving the packet. The information carried in each field is defined by the associated version of the IEEE 802.11 standard. Some PPDU formats may include unused bits (or unused values for one or more fields) in the physical layer preamble that are reserved for later versions of the IEEE 802.11 standard. A wireless communication device (such as an AP or a STA) that is configured to operate in accordance with a particular version of the IEEE 802.11 standard may not set the value of a reserved bit (or field) to a value that is not supported by that version of the IEEE 802.11 standard.

Newer versions of the IEEE 802.11 standard may be implemented in multiple "releases." For example, an initial release (R1) may enable enhanced WLAN communication features not supported by previous versions of the IEEE 802.11 standard, while a later release (R2) may provide additional WLAN communication features not supported by R1. Some of the enhancements in R2 may be implemented by repurposing one or more reserved bits or values associated with the PPDU format of R1. As a result, a wireless communication device configured to operate in accordance with R1 may not be able to interpret certain bits or fields of a PPDU formatted in accordance with R2. Thus, new processes or techniques are needed to support the transmission of PPDUs between wireless communication devices configured to operate in accordance with different releases of the same version of the IEEE 802.11 standard.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving, over a wireless channel, a physical layer convergence protocol (PLCP) protocol data unit (PPDU) including a physical layer (PHY) preamble followed by a data portion and selectively terminating the reception of the PPDU based on a reserved bit in the PHY preamble having a value that is different than a known value associated with the reserved bit. In some implementations, the PHY preamble may include a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

In some aspects, the selective terminating of the reception of the PPDU may include terminating the reception of the PPDU based on a location of the reserved bit in the PHY preamble. In some implementations, the reserved bit may be located immediately after a punctured channel indication subfield of U-SIG, where the punctured channel indication subfield carries information indicating whether puncturing is performed on one or more subchannels of the wireless channel. In some implementations, the reserved bit may be located immediately after a PPDU type and compression mode subfield of U-SIG, where the PPDU type and compression mode subfield carries information indicating a format of the PPDU. In some implementations, U-SIG may include a plurality of version-independent fields followed by a plurality of version-dependent fields, where the reserved bit is located after the plurality of version-independent fields and before the plurality of version-dependent fields. In some implementations, the reserved bit may be located in a user field of a non-legacy signal field that follows U-SIG in the PHY preamble, where the user field includes an association identifier (AID) subfield. In such implementations, the reception of the PPDU may be terminated based on the AID subfield being set to an AID value assigned to the wireless communication device.

In some other aspects, the selective terminating of the reception of the PPDU may include continuing the reception of the PPDU based on a location of the reserved bit in the PHY preamble. In some implementations, the reserved bit may be located in a common field included in a non-legacy signal field that follows U-SIG in the PHY preamble, where the common field includes one or more version-dependent fields. In such implementations, the reserved bit may be located immediately after one of the one or more version-dependent fields. In some implementations, the reserved bit may be located in a user field of a non-legacy signal field that follows U-SIG in the PHY preamble, where the user field includes an AID subfield. In such implementations, the reception of the PPDU may be continued based on the AID subfield being set to an AID value not assigned to the wireless communication device.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving, over a wireless channel, a PPDU including a PHY preamble followed by a data portion and selectively terminating the reception of the PPDU based on a reserved bit in the PHY preamble having a value that is different than a known value associated with the reserved bit.

Another innovative aspect of the subject matter described in this disclosure can be implemented as a method of wireless communication. The method may be performed by a wireless communication device and may include receiving, over a wireless channel, a PPDU including a PHY preamble followed by a data portion and selectively terminating the reception of the PPDU based on a subfield of the PHY preamble being set to a reserved value. In some implementations, the PHY preamble includes an L-STF, an L-LTF, an L-SIG, an RL-SIG that immediately follows L-SIG, and a U-SIG that immediately follows RL-SIG and carries information for interpreting one or more subsequent fields of the PHY preamble.

In some aspects, the selective terminating of the reception of the PPDU may include terminating the reception of the PPDU based on a type of information carried in the subfield. In some implementations, the subfield may be a PPDU bandwidth subfield of U-SIG that carries information indicating a bandwidth of the wireless channel. In some implementations, the subfield may be a punctured channel indication subfield of U-SIG that carries information indicating whether puncturing is performed on one or more subchannels of the wireless channel. In some implementations, the subfield may be a PPDU type and compression mode subfield of U-SIG that carries information indicating a format of the PPDU. In some implementations, the subfield may be included in a user field of a non-legacy signal field that follows U-SIG in the PHY preamble, where the reception of the PPDU is terminated based on an AID subfield of the user field being set to an AID value assigned to the wireless communication device. In such implementations, the subfield may be a spatial configuration subfield that carries information indicating a number of spatial streams allocated for a user associated with the user field.

In some implementations, the subfield may be a number of non-legacy LTF symbols subfield of a common field included in a non-legacy signal field that follows U-SIG in the PHY preamble, where the number of non-legacy LTF symbols subfield carries information indicating a number of non-legacy LTF symbols in the PPDU following the non-legacy signal field. In some implementations, the subfield may be an RU allocation subfield of a common field included in a non-legacy signal field that follows U-SIG in the PHY preamble, where the RU allocation subfield carries information indicating an allocation of RUs for one or more users associated with the user specific field.

In some other aspects, the selective terminating of the reception of the PPDU may include continuing the reception of the PPDU based on a type of information carried in the subfield. In some implementations, the subfield may be an RU allocation subfield of a common field included in a non-legacy signal field that follows U-SIG in the PHY preamble, where the RU allocation subfield carries information indicating an allocation of RUs for one or more users associated with the user specific field. In such implementations, a pattern of bits in the RU allocation subfield may indicate a number of user fields in the user specific field that are associated with the RU allocation subfield. In some implementations, the subfield may be included in a user field of a non-legacy signal field that follows U-SIG in the PHY preamble, where the reception of the PPDU is terminated based on an AID subfield of the user field being set to an AID value assigned to the wireless communication device. In such implementations, the subfield may be a spatial configuration subfield of the user field that carries information indicating a number of spatial streams allocated for a user associated with the user field.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving, over a wireless channel, a PPDU including a PHY preamble followed by a data portion and selectively terminating the reception of the PPDU based on a subfield of the PHY preamble being set to a reserved value.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
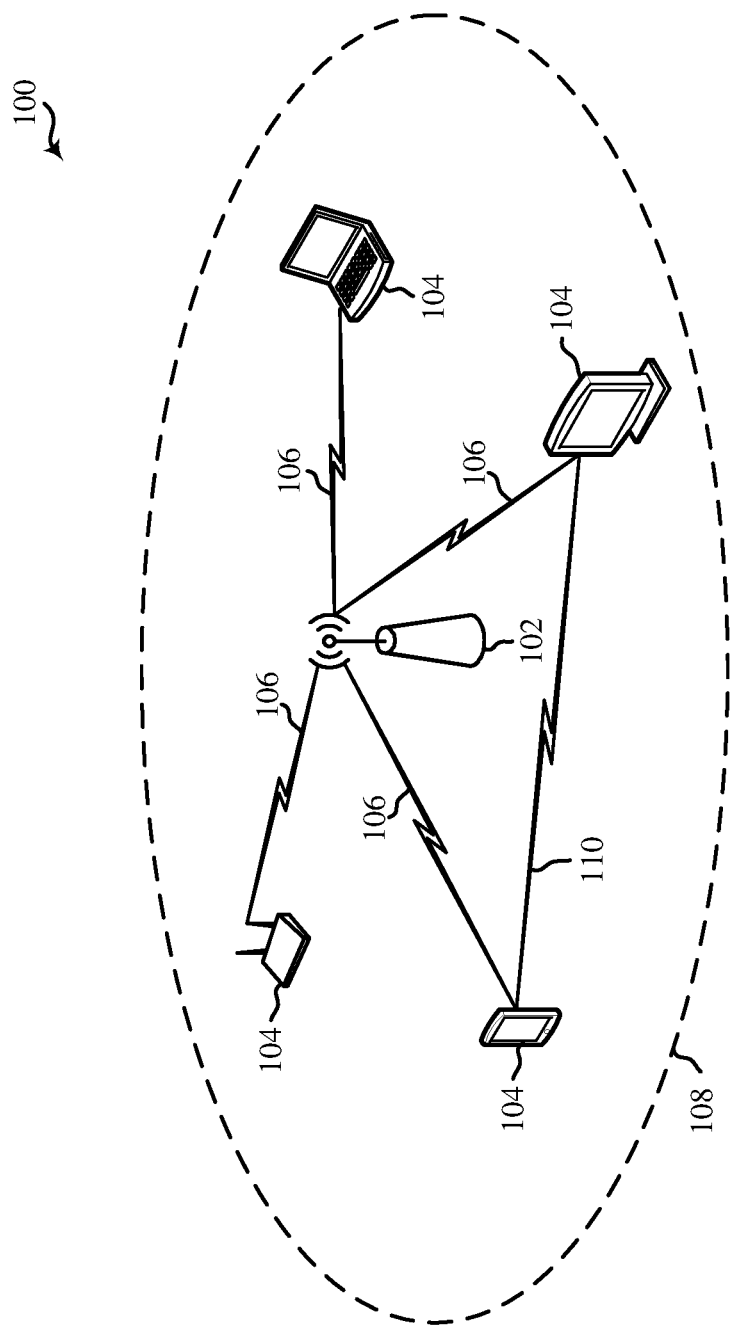
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to packet formats that support new wireless communication protocols, and more particularly, to techniques for interpreting reserved bits and values associated with different releases of a wireless communication protocol such as, for example, the IEEE 802.11be amendment, or future generations, of the IEEE 802.11 standard. In some aspects, a receiving device may determine whether to terminate (or continue) reception of a physical layer protocol convergence protocol (PLCP) protocol data unit (PPDU) if it detects a reserved bit in the physical layer preamble set to an unsupported value (such as a value different than what is defined by a version or release of the wireless communication protocol supported by the wireless communication device). In some implementations, the reserved bit may be categorized as a "validate bit" or a "disregard bit" based on its location in the PPDU. In such implementations, the receiving device may terminate the reception of the PPDU if a validate bit is set to an unsupported value but may continue to receive the PPDU if a disregard bit is set to an unsupported value. In some other aspects, a receiving device may determine whether to terminate (or continue) reception of a PPDU if it detects a field in the physical layer preamble set to a reserved value (such as defined by a version or release of the wireless communication protocol supported by the wireless communication device). In some implementations, the reserved value may represent a "validate state" or a "disregard state" based on the type of information to be conveyed by the corresponding field. In such implementations, the receiving device may terminate the reception of the PPDU if the field is set to a reserved value representing a validate state but may continue to receive the PPDU if the field is set to a reserved value representing a disregard state.

Particular implementations of the subject matter described in this disclosure can be implemented to realize one or more of the following potential advantages. The present implementations enable wireless communication devices that are configured to operate in accordance with earlier releases of the IEEE 802.11be amendment (or future generations) of the IEEE 802.11 standard to manage reception of PPDUs formatted in accordance with later releases of the IEEE 802.11be amendment. For example, aspects of the present disclosure recognize that some fields in the physical layer preamble carry signaling or information necessary to receive the PPDU, whereas the information carried in some other fields of the preamble may not be necessary to receive the PPDU. Aspects of the present disclosure also recognize that some reserved bits may be used in later releases to expand a range of values that can be represented by existing fields in an earlier release, whereas some other reserved bits may be used to convey information that is unrelated to any information conveyed in the earlier release. By categorizing some reserved bits and values of a PPDU as "validate" or "disregard," aspects of the present disclosure may enable the receiving device to determine, based on the reserved bits or values, whether it can continue to receive the remainder of the PPDU. As such, the receiving device may terminate reception of any PPDUs that it cannot receive correctly.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 2A:
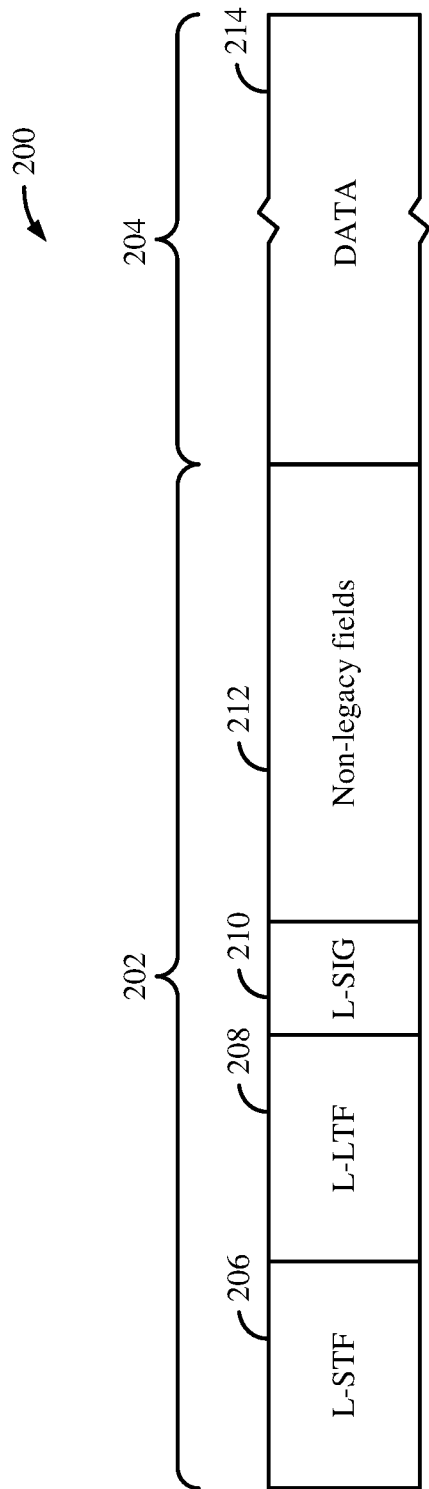
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
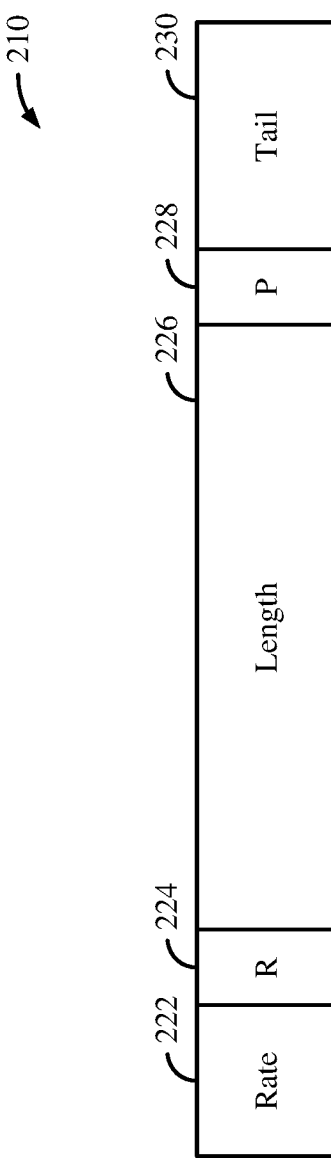
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
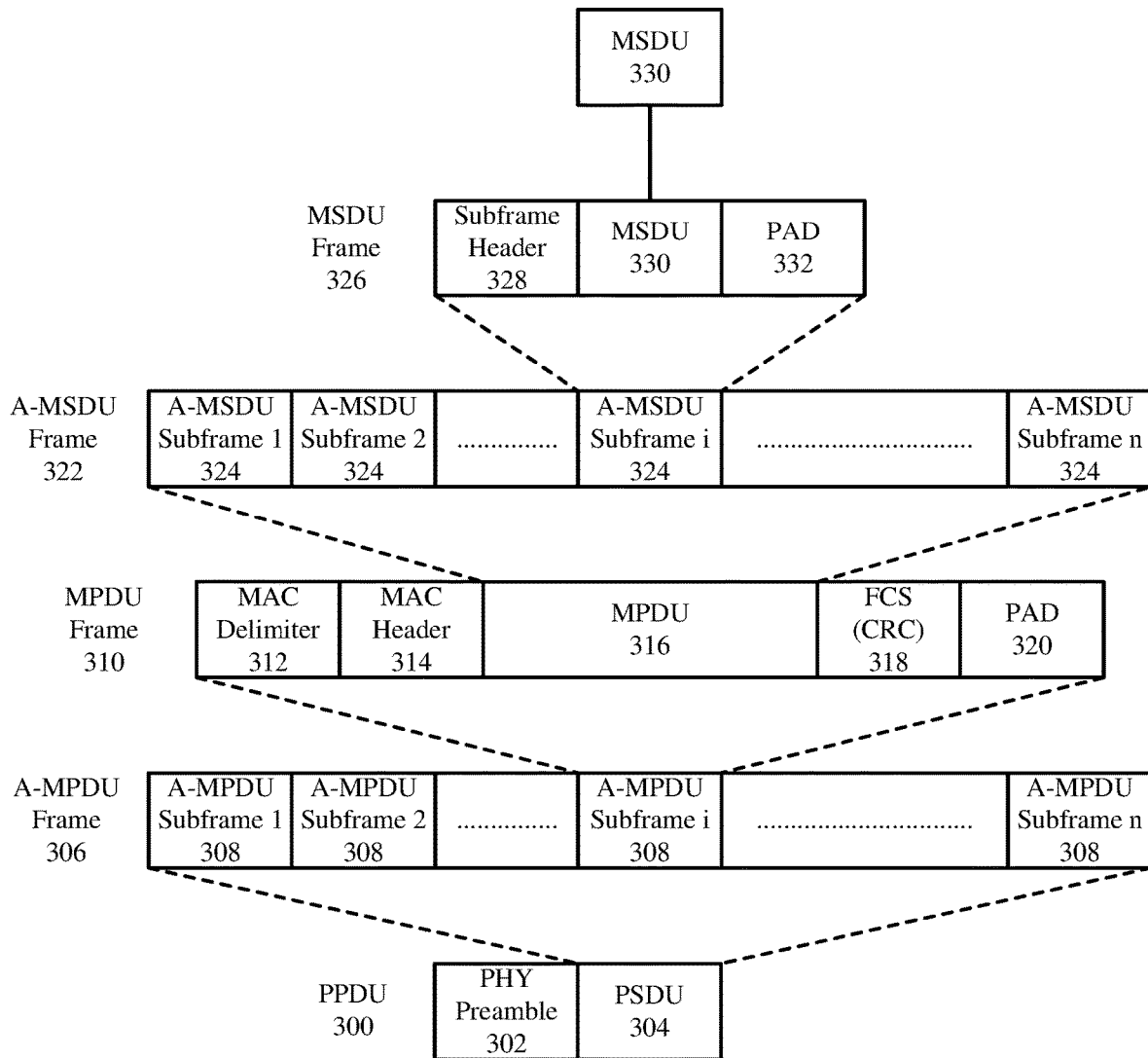
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
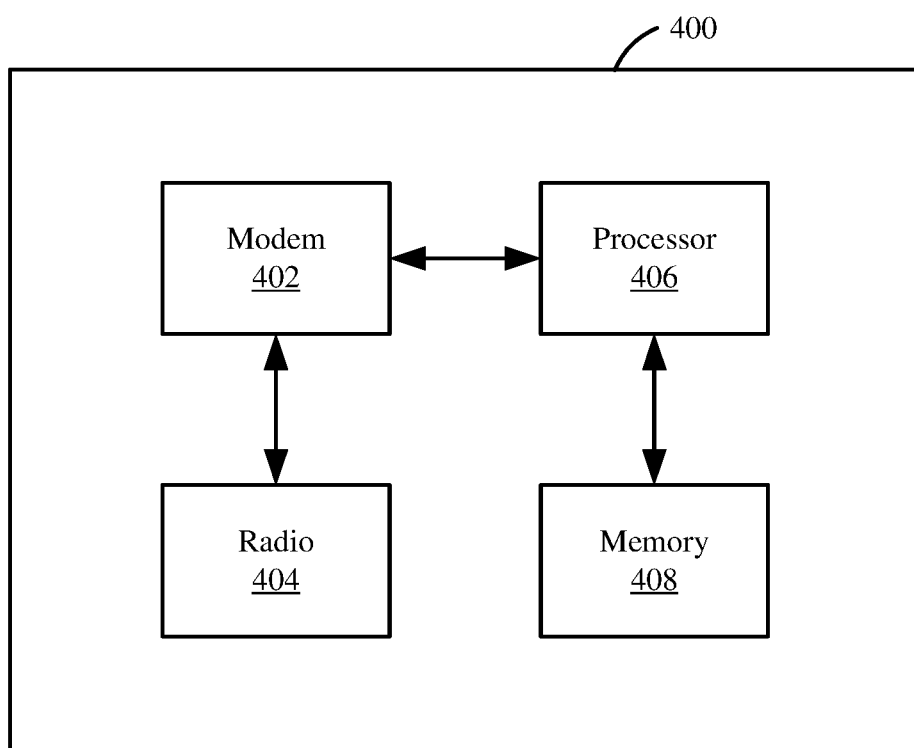
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
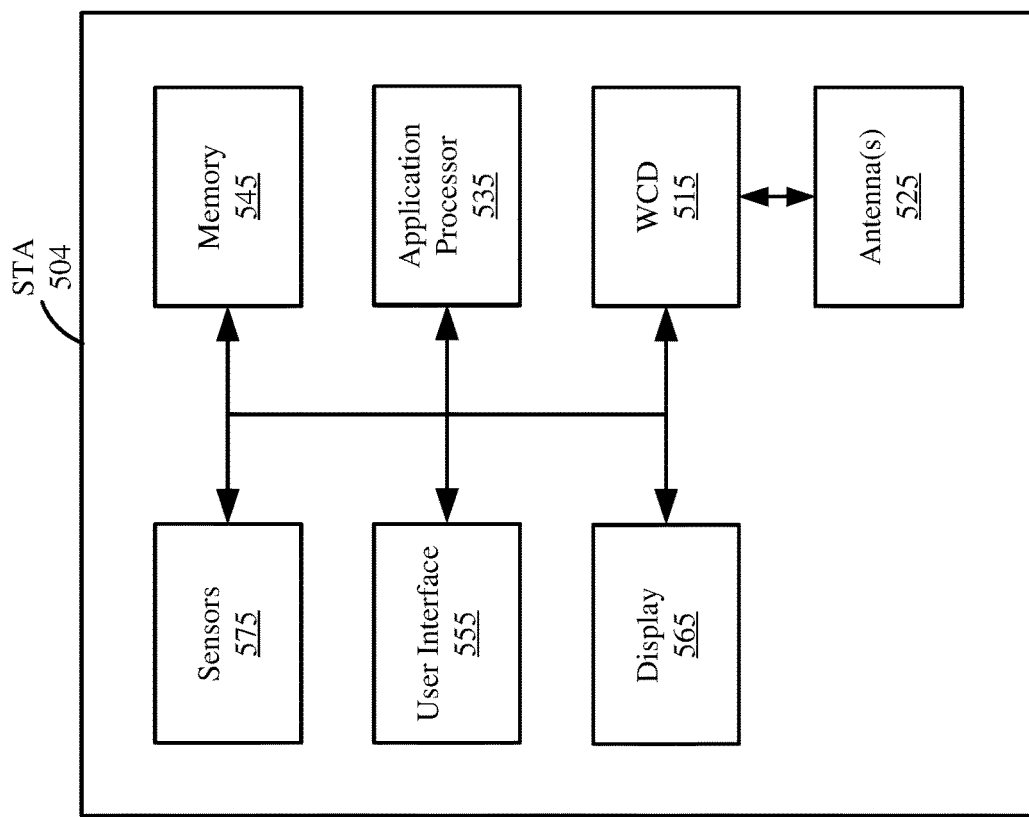
FIG. 5B shows a block diagram of an example STA.
Figure 5A:
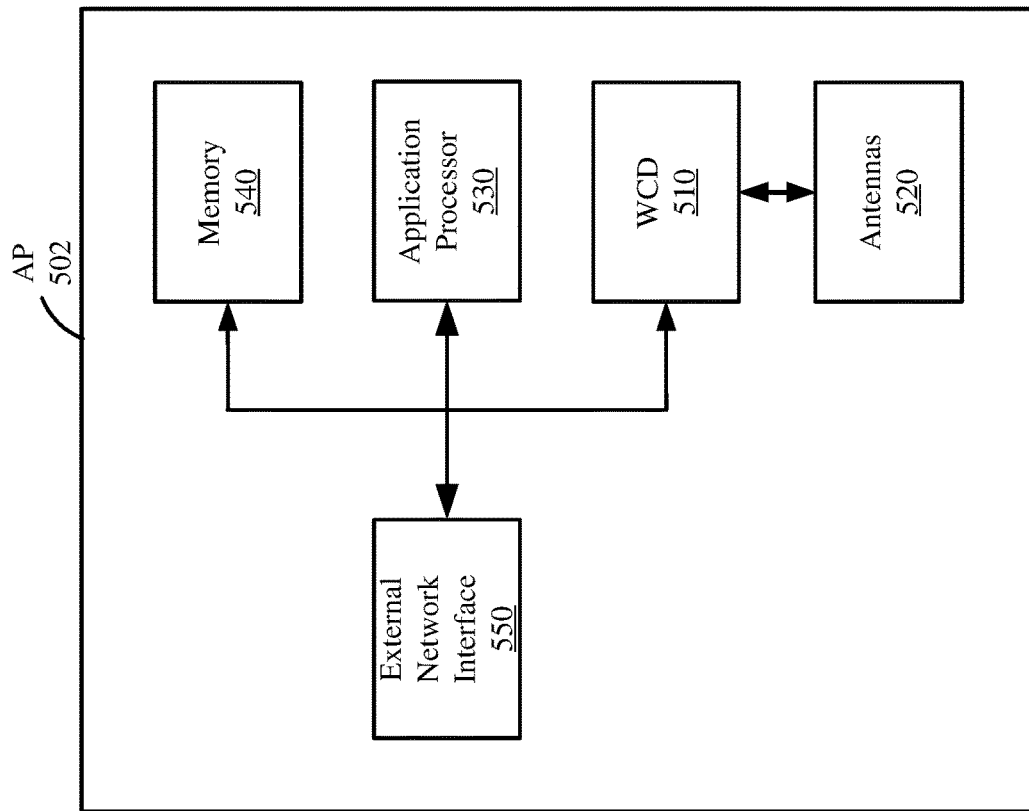
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, some PPDU formats may include unused bits (or unused values for one or more fields) in the physical layer preamble that are reserved for later versions of the IEEE 802.11 standard. The IEEE 802.11be amendment, or future generations, of the IEEE 802.11 standard may be implemented in multiple "releases." For example, an initial release (R1) may enable enhanced WLAN communication features not supported by previous versions of the IEEE 802.11 standard, while a later release (R2) may provide additional WLAN communication features not supported by R1. Some of the enhancements in R2 may be implemented by repurposing one or more reserved bits or values associated with the PPDU format of R1. As a result, a wireless communication device configured to operate in accordance with R1 may not be able to interpret certain bits or fields of a PPDU formatted in accordance with R2.

Various aspects relate generally to packet formats that support new wireless communication protocols, and more particularly, to techniques for interpreting reserved bits and values associated with different releases of a wireless communication protocol such as, for example, the IEEE 802.11be amendment, or future generations, of the IEEE 802.11 standard. In some aspects, a receiving device may determine whether to terminate (or continue) reception of a PPDU if it detects a reserved bit in the physical layer preamble set to an unsupported value (such as a value different than what is defined by a version or release of the wireless communication protocol supported by the wireless communication device). In some implementations, the reserved bit may be categorized as a "validate bit" or a "disregard bit" based on its location in the PPDU. In such implementations, the receiving device may terminate the reception of the PPDU if a validate bit is set to an unsupported value but may continue to receive the PPDU if a disregard bit is set to an unsupported value. In some other aspects, a receiving device may determine whether to terminate (or continue) reception of a PPDU if it detects a field in the physical layer preamble set to a reserved value (such as defined by a version or release of the wireless communication protocol supported by the wireless communication device). In some implementations, the reserved value may represent a "validate state" or a "disregard state" based on the type of information to be conveyed by the corresponding field. In such implementations, the receiving device may terminate the reception of the PPDU if the field is set to a reserved value representing a validate state but may continue to receive the PPDU if the field is set to a reserved value representing a disregard state.

Particular implementations of the subject matter described in this disclosure can be implemented to realize one or more of the following potential advantages. The present implementations enable wireless communication devices that are configured to operate in accordance with earlier releases of the IEEE 802.11be amendment (or future generations) of the IEEE 802.11 standard to manage reception of PPDUs formatted in accordance with later releases of the IEEE 802.11be amendment. For example, aspects of the present disclosure recognize that some fields in the physical layer preamble carry signaling or information necessary to receive the PPDU, whereas the information carried in some other fields of the preamble may not be necessary to receive the PPDU. Aspects of the present disclosure also recognize that some reserved bits may be used in later releases to expand a range of values that can be represented by existing fields in an earlier release, whereas some other reserved bits may be used to convey information that is unrelated to any information conveyed in the earlier release. By categorizing some reserved bits and values of a PPDU as "validate" or "disregard," aspects of the present disclosure may enable the receiving device to determine, based on the reserved bits or values, whether it can continue to receive the remainder of the PPDU. As such, the receiving device may terminate reception of any PPDUs that it cannot receive correctly.

Figure 6:
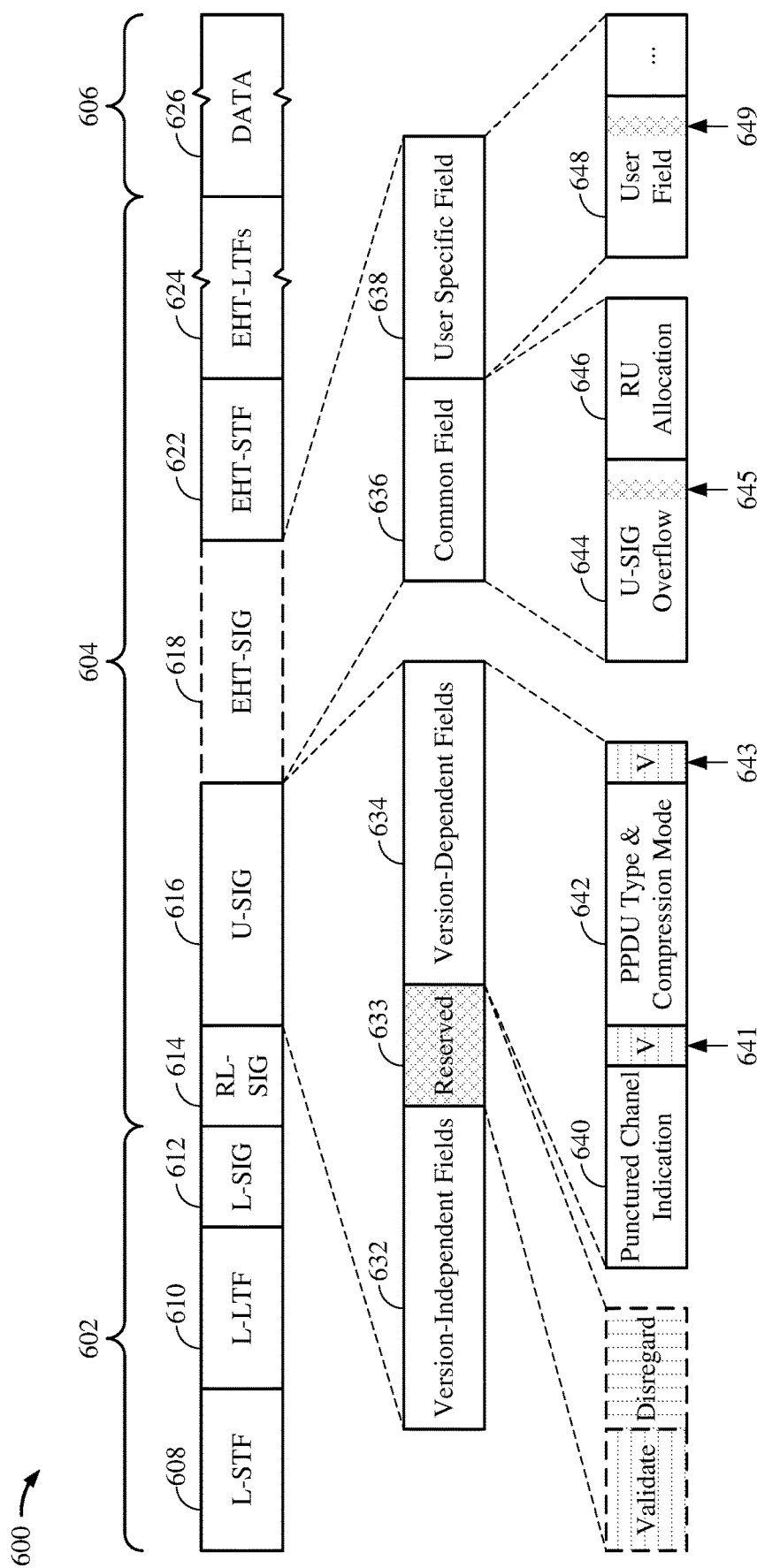
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 includes a PHY preamble including a first portion 602 and a second portion 604. The PPDU 600 may further include a PHY payload 606 after the preamble, for example, in the form of a PSDU carrying a DATA field 626. In some implementations, the PPDU 600 may be formatted as a non-legacy or Extremely High Throughput (EHT) PPDU. As used herein, the term "non-legacy" may refer to PPDU formats and communication protocols conforming to the IEEE 802.11be amendment, and future generations, of the IEEE 802.11 standard.

The first portion 602 of the PHY preamble includes L-STF 608, L-LTF 610, and L-SIG 612. The second portion 604 of the PHY preamble includes a repeated legacy signal field (RL-SIG) 614, a universal signal field (U-SIG) 616, a non-legacy short training field (EHT-STF) 622, and a number of non-legacy long training fields (EHT-LTFs) 624. In some implementations (such as for single-user (SU) or multi-user (MU) PPDU formats), the second portion 604 also may include a non-legacy signal field (EHT-SIG) 618 immediately following U-SIG 616. In the IEEE 802.11be amendment, and future generations of the IEEE 802.11 standard, new fields may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618).

In some implementations, U-SIG 616 may include signaling regarding types or formats of additional signal fields (such as EHT-SIG 618) that follow U-SIG 616. Such signaling may be carried in one or more version-independent fields 632 and one or more version-dependent fields 634. The version-independent fields 632 may include, for example, a version identifier subfield carrying information indicating a version of the wireless communication protocol (starting from the IEEE 802.11be amendment and beyond) and PPDU bandwidth (BW) subfield carrying information indicating a bandwidth associated with the PPDU 600 (such as from 20 MHz to 320 MHz). The version-dependent fields 634 may carry format information fields used for interpreting other fields of U-SIG 616 or EHT-SIG 618. Example version-dependent fields 634 include a punctured channel indication subfield 640 carrying information indicating whether puncturing is performed on one or more subchannels of a wireless channel associated with the PPDU 600 and a PPDU type and compression mode subfield 642 carrying information indicating a format of the PPDU 600.

In some implementations, EHT-SIG 618 may include a common field 636 and a user specific field 638. In some implementations, the common field 636 may include U-SIG overflow 644 representing one or more bits or fields overflowed from U-SIG 616 and an RU allocation subfield 646 carrying information indicating an allocation of RUs for intended recipients of the PPDU 600. The user specific field 638 may include a number (N) of user fields 648 carrying per-user information for intended recipients of the PPDU 600. In some other implementations, the RU allocation subfield 646 and the user specific field 638 may be absent from the PPDU 600 (such as in the SU PPDU format). Still further, in some other implementations, EHT-SIG 618 may be absent from the PPDU 600 (such as in the TB PPDU format).

In some implementations, the PPDU 600 may include a number of reserved bits in the PHY preamble (such as in U-SIG 616 and EHT-SIG 618). As described above, reserved bits represent unused bits that are reserved for future implementations of the IEEE 802.11 standard. For example, reserved bits in an earlier release (R1) of a given version or amendment of the IEEE 802.11 standard may be repurposed (to carry information) in a later release (R2). As a result, a wireless communication device configured to operate in accordance with R1 (also referred to herein as an "R1 device") may be unable to interpret or receive some PPDUs that are formatted in accordance with R2. Because R1 and R2 correspond to the same version of the IEEE 802.11 standard, a receiving device may not be able to differentiate a PPDU formatted in accordance with R1 from a PPDU formatted in accordance with R2 based on the version identifier information carried in U-SIG 616.

Some reserved bits in the PHY preamble may be repurposed, in later releases, to expand a range of values that can be represented by existing fields in an earlier release. Aspects of the present disclosure recognize that the information carried on such reserved bits may be necessary for interpreting other fields of the PHY preamble or otherwise receiving the PPDU. These reserved bits may be classified as "validate" bits. In some implementations, when receiving a PPDU, a receiving device may compare the values of one or more validate bits with known values for the reserved bits as defined by the supported release or version of the IEEE 802.11 standard. If the values of the validate bits do not match the known values (suggesting that the validate bits have been repurposed to carry information necessary for receiving the PPDU), the receiving device may terminate reception of the PPDU. For example, this may prevent the receiving device from incorrectly receiving or processing the information in the PPDU, which may result in unexpected behavior.

Some other reserved bits in the PHY preamble may be repurposed, in later releases, to convey information that is unrelated to any information conveyed in the earlier release (or remains unused in the later release). Aspects of the present disclosure recognize that the information carried on such reserved bits may not be necessary for interpreting other fields of the PHY preamble or receiving the PPDU. These reserved bits may be classified as "disregard" bits. In some implementations, when receiving a PPDU, a receiving device may ignore the values of the disregard bits in determining whether to terminate or continue reception of the PPDU. In other words, the receiving device may continue receiving the PPDU even if the values of the disregard bits do not match the known values for the reserved bits. For example, this may allow the receiving device to disregard information carried in PHY preamble that is not necessary for receiving or processing other information in the PPDU that may be relevant to the receiving device.

Whether a reserved bit is classified as a validate bit or a disregard bit may depend on its bit position in the PHY preamble. For example, some reserved bits that are adjacent to (such as immediately following) a particular field or subfield in the PHY preamble are more likely to be repurposed to expand the length (or range of values) of the adjacent field or subfield in a later release or version of the IEEE 802.11 standard. Accordingly, these reserved bits may be classified as validate bits. Other determining factors in classifying a reserved bit may include whether the reserved bit is associated with information intended for the receiving device. For example, a PPDU may carry data or information for multiple receiving devices (such as information carried in different user fields 648). In such instances, some reserved bits may be associated with information intended for other receiving devices and may not affect the ability of the receiving device to process its information from the PPDU. Accordingly, these reserved bits may be classified as disregard bits.

In the example of FIG. 6, the PPDU 600 is shown to include a number of reserved bits 633 immediately following the version-independent fields 632 (and immediately preceding the version-dependent fields 634), a reserved bit 641 immediately following the punctured channel indication subfield 640, and another reserved bit 643 immediately following the PPDU type and compression mode subfield 642. In implementations of the PPDU 600 that include EHT-SIG 618, the U-SIG overflow 644 of the common field 636 may include a number of reserved bits 645 and one or more user fields 648 of the user specific field 638 also may include a reserved bit 649. In some implementations, the format of the PPDU 600 depicted in FIG. 6 may be one example of the PPDU format defined by an initial release (R1) of the IEEE 802.11be amendment of the IEEE 802.11 standard. In other words, wireless communication devices configured to operate in accordance with R1 of the IEEE 802.11be amendment may interpret bits 633, 641, 643, 645, and 649 as reserved bits. Table 1, below, shows a more detailed representation of the various fields and subfields of the PPDU 600 as well as the locations of the reserved bits.

TABLE 1

| Field | Category | Subfield | # Bits |
|---|---|---|---|
| U-SIG | Version Independent | Version Identifier | 3 |
| | | PPDU BW | 3 |
| | | UL/DL | 1 |
| | | BSS Color | 6 |
| | | TXOP | 7 |
| | | Reserved (Disregard) | 3 |
| | | Reserved (Validate) | 3 |
| | Version Dependent | Punctured Channel Indication | 5 |
| | | Reserved (Validate) | 1 |
| | | PPDU Type & Compression Mode | 2 |
| | | Reserved (Validate) | 1 |
| | | EHT-SIG MCS | 2 |
| | | Number of EHT-SIG Symbols | 5 |
| | CRC & Tail | CRC in U-SIG | 4 |
| | | Tail in U-SIG | 6 |
| | | Total # Bits in U-SIG | 52 |
| EHT-SIG | Version Dependent (U-SIG Overflow) | Spatial Reuse | 4 |
| | | GI + LTF Size | 2 |
| | | Number of EHT-LTF Symbols | 3 |
| | | Pre-FEC Padding | 2 |
| | | LDPC Extra Symbol Segment | 1 |
| | | Reserved (Disregard) | 2 |
| | | Reserved (Validate) | 2 |
| | | PE Disambiguity | 1 |
| | | Total # Overflow Bits | 17 |

In some implementations, one or more of the reserved bits 633 between the version-independent fields 632 and the version-dependent fields 634 may be classified as validate bits and one or more of the reserved bits 633 may be classified as disregard bits. For example, assuming there are six reserved bits 633 between the version-independent fields 632 and the version-dependent fields 634, three of the reserved bits 633 may be classified as validate bits and the remaining three reserved bits 633 may be classified as disregard bits. Similarly, in some implementations, one or more of the reserved bits 645 in the common field 636 (among the U-SIG overflow 644) may be classified as validate bits and one or more of the reserved bits 645 may be classified as disregard bits. For example, assuming there are four reserved bits 645 in the common field 636, two of the reserved bits 645 may be classified as validate bits and the remaining two reserved bits 645 may be classified as disregard bits.

In some implementations, the reserved bits 641 and 643 immediately following the punctured channel indication subfield 640 and the PPDU type and compression mode subfield 642, respectively, may be classified as validate (V) bits. For example, reserved bit 641 may be repurposed to expand the punctured channel indication subfield 640 in a later release. Similarly, reserved bit 643 may be repurposed to expand the PPDU type and compression mode subfield 642 in a later release. Further, in some implementations, the classification of the reserved bit 649 in each user field 648 may depend on whether the user field 648 carries information for the receiving device. For example, each user field 648 may further include an association identification (AID) subfield (not shown for simplicity). The value of the AID subfield is configured to match a unique AID value that is assigned to a particular receiving device. In some aspects, the reserved bit 649 in the user field 648 may be classified as a validate bit if the value of the AID subfield matches the AID value assigned to the receiving device. In some other aspects, the reserved bit 649 in the user field 648 may be classified as a disregard bit if the value of the AID subfield does not match the AID value assigned to the receiving device.

Some fields or subfields of the PHY preamble also may be defined to have one or more reserved values. Similar to a reserved bit, a reserved value represents an unused value (such as an integer value) for a given field or subfield that is reserved for later releases or versions of the IEEE 802.11 standard. For example, a 3-bit field can be used to convey one of eight different bit patterns (representing 8 different integer values, from 0 to 7). However, an initial release of a given version of the IEEE 802.11 standard may utilize only 7 of the 8 available values (corresponding to integer values 0 to 6) to convey relevant information. The remaining unused value (integer value 7) represents a reserved value. Later releases of the same version of the IEEE 802.11 standard may repurpose the reserved value to convey new information associated with the underlying field or subfield.

Aspects of the present disclosure recognize that the information represented by some reserved values may be necessary for interpreting other fields of the PHY preamble or otherwise receiving the PPDU. These reserved values may be classified as "validate" states. In some implementations, when receiving a PPDU, a receiving device may terminate reception of a PPDU if it determines that one or more fields or subfields in the PHY preamble are set to a validate state. Aspects of the present disclosure also recognize that the information represented by some other reserved values may not be necessary for interpreting other fields of the PHY preamble or receiving the PPDU. These reserved values may be classified as "disregard" states. In some implementations, when receiving a PPDU, a receiving device may ignore one or more fields or subfields in the PHY preamble that are set to a disregard state.

Whether a reserved value is classified as a validate state or a disregard state may depend on the type of information intended to be conveyed by the underlying field or subfield. For example, some fields may be configured to carrying information necessary for interpreting other fields or subfields of the PPDU. If a reserved value is detected in any of these fields, the receiving device may classify the reserved value as a validate state. Other determining factors in classifying a reserved bit may include whether the reserved value is associated with information intended for the receiving device. As described above, a PPDU may carry data or information for multiple receiving devices (such as information carried in different user fields 648). In such instances, some reserved values may represent information intended for other receiving devices and may not affect the ability of the receiving device to process its information from the PPDU. Accordingly, these reserved values may be classified as disregard states.

With reference for example to Table 1, the PPDU bandwidth (BW) subfield carries information indicating a bandwidth of the PPDU 600 (or the wireless channel on which the PPDU 600 is transmitted), the punctured channel indication subfield carries information indicating whether puncturing is performed on one or more subchannels of the wireless channel, the PPDU type and compression mode subfield carries information indicating a format of the PPDU 600, and the number of EHT-LTF symbols subfield carries information indicating how many EHT-LTF symbols 624 precede the data portion 626. Aspects of the present disclosure recognize that each of these subfields carries information necessary for receiving the PPDU 600. Thus, in some implementations, reserved values in the PPDU BW subfield, the punctured channel indication subfield, the PPDU type and compression mode subfield, or the number of EHT-LTF symbols subfield may be classified as validate states.

The spatial reuse subfield (in EHT-SIG 618) carries information indicating whether spatial reuse is permitted in one or more subchannels of the wireless channel. Spatial reuse is a technique that can be used in resolving collisions when contending for access to a shared wireless medium. More specifically, spatial reuse techniques may relax the requirements for winning contention when interfering transmissions are associated with an overlapping BSS (OBSS). As such, aspects of the present disclosure recognize that spatial reuse parameters are not necessary for receiving the PPDU 600 or interpreting any fields or subfields included therein. Thus, in some implementations, reserved values in the spatial reuse subfield may be classified as validate states.

In some aspects, a user field 648 may include a spatial configuration subfield (not shown for simplicity) that carries information indicating a number of spatial streams allocated for a user associated with the user field 648. In some other aspects, a user field 648 may include a number of space-time-streams (NSTS) subfield that carries information indicating a number of space-time-streams allocated for a user associated with the user field 648. Aspects of the present disclosure recognize that the information carried in the spatial configuration and NSTS subfields are necessary for receiving the PPDU 600. However, as described above, the information carried in a particular user field 648 is intended only for the receiving device associated with the user field 648 (having a matching AID value). Thus, in some implementations, a reserved value in the spatial configuration subfield or the NSTS subfield of a user field 648 may be classified as a validate state if the value of the AID subfield matches the AID value assigned to the receiving device. In some other implementations, a reserved value in the spatial configuration subfield or the NSTS subfield of a user field 648 may be classified as a disregard state if the value of the AID subfield does not match the AID value assigned to the receiving device.

As described above, the RU allocation subfield 646 carries information indicating an allocation of RUs for one or more users associated with the user specific field 638. Aspects of the present disclosure recognize that RU allocation information may be necessary for receiving the PPDU 600. Thus, in some implementations, a reserved value in the RU allocation subfield 646 may be classified as a validate state. However, aspects of the present disclosure also recognize that placing such a restriction on the RU allocation subfield 646 may prevent the multiplexing of RUs defined by an earlier release (referred to herein as R1 RUs) with RUs defined by a later release (referred to herein as R2 RUs) in the same PPDU 600. For example, later releases of the IEEE 802.11be amendment may support an allocation of multiple RUs to a single user (referred to as a multi-RU or M-RU). However, if an R1 device is configured to terminate reception of a PPDU upon determining that the RU allocation subfield 646 is set to a validate state, M-RUs may not be multiplexed with RUs for R1 devices in the same PPDU.

In some implementations, a transmitting device may multiplex R1 RUs with R2 RUs in the same PPDU 600 by transmitting the R1 RUs and the R2 RUs on different content channels. A content channel defines a grouping of subchannels. For example, a first content channel may carry the signaling information for all odd-numbered subchannels (such as the $1^{st}$, $3^{rd}$, $5^{th}$, $7^{th}$, $9^{th}$, $11^{th}$, $13^{th}$, and $15^{th}$ 20 MHz subchannels of a 320 MHz channel) and a second content channel may carry the signaling information for all even-numbered subchannels (such as the $2^{nd}$, $4^{th}$, $6^{th}$, $8^{th}$, $10^{th}$, $12^{th}$, $14^{th}$, and $16^{th}$ 20 MHz subchannels of a 320 MHz channel). In some implementations, EHT-SIG 618 may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

Figure 7:
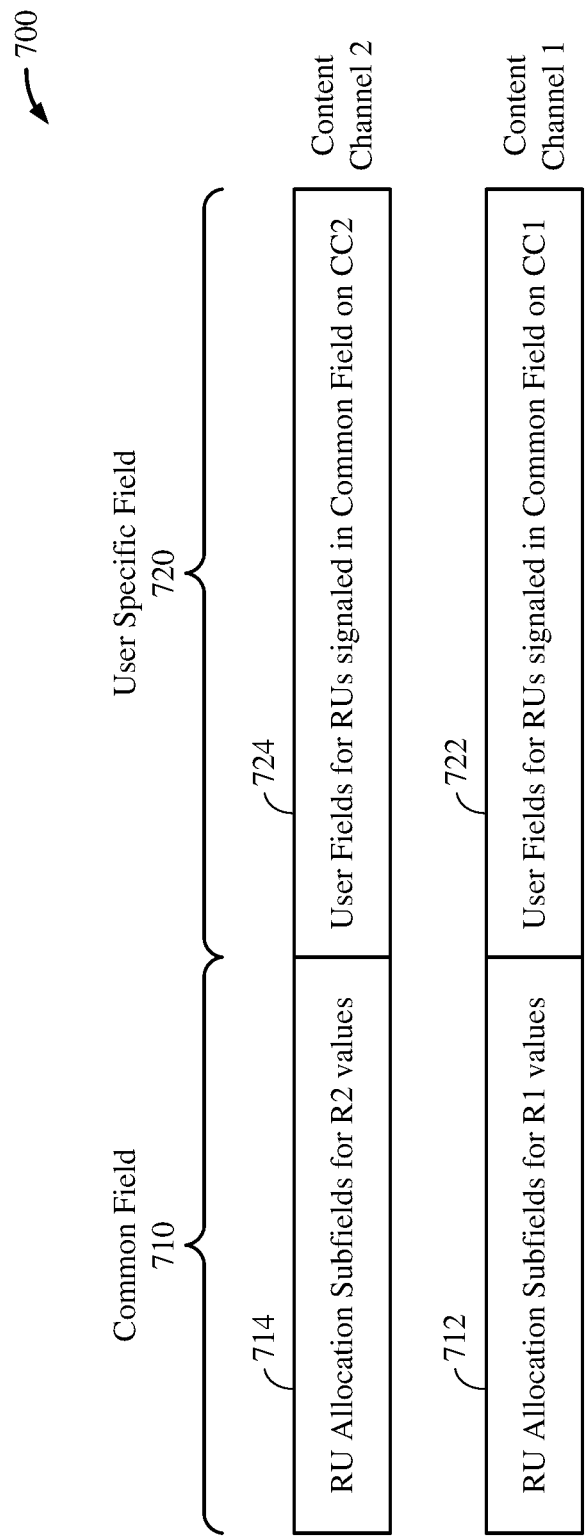
FIG. 7 shows an example content channel structure of a non-legacy signal field of a PPDU according to some implementations.

FIG. 7 shows an example content channel structure of a non-legacy signal field 700 of a PPDU according to some implementations. In some implementations, the non-legacy signal field 700 may be one example of EHT-SIG 618 of FIG. 6. The non-legacy signal field 700 includes a common field 710 and a user specific field 720. In the example of FIG. 7, the common field 710 and user specific field 720 are distributed over two content channels (content channel 1 and content channel 2). More specifically, the common field 710 includes one or more RU allocation subfields 712 that are transmitted on content channel 1 (CC1) and one or more RU allocation subfields 714 that are transmitted on content channel 2 (CC2). In some implementations, the common field 710 also may include one or more fields overflowed from U-SIG (not shown for simplicity). The user specific field 720 includes one or more user fields 722 that are transmitted on CC1 and one or more user fields 724 that are transmitted on CC2. In this configuration, the RU allocation subfields 712 on CC1 carry RU allocation information associated with the user fields 722 on CC1, and the RU allocation subfields 714 on CC2 carry RU allocation information associated with the user fields 724 on CC2.

In some implementations, each of the RU allocation subfields 712 on CC1 may only be set to a value supported by an earlier release (referred to herein as an R1 value). In other words, only R1 RUs may be signaled on CC1. However, each of the RU allocation subfields 714 on CC2 may be set to a value supported by a later release (referred to herein as an R2 value). Accordingly, R2 RUs may be signaled on CC2. In some implementations, an R1 receiving device may classify the R2 values of the RU allocation subfields 714 as validate states and terminate reception of the PPDU on CC2 (or the subchannels associated therewith). On the other hand, the receiving device may interpret the R1 values of the RU allocation subfields 712 and thus continue reception of the PPDU on CC1 (or the subchannels associated therewith). In some implementations, the RU allocation subfields 712 on CC1 may carry RU allocation information for R1 devices and R2 devices (such as any wireless communication device configured to operate in accordance with R2) as long as the RU allocation information represents an R1 value.

The value of an RU allocation subfield indicates the allocation of RUs for each user associated with the user specific field as well as the number of user fields in the user specific field. Aspects of the present disclosure recognize that a receiving device may be unable to continue processing or receiving the PPDU if it does know the number of user fields in the user specific field. More specifically, the receiving device may need to know how many user fields to "skip" in order to reach the next field or subfield carrying relevant information (such as the particular user field intended for the receiving device). In some implementations, only the last RU allocation subfields in a common field may be set to R2 values. This ensures that the user fields associated with such RU allocation subfields are located at the end of the user specific field. As a result, the R1 device does not need to interpret the information carried in the last RU allocation subfields to determine the number of user fields to skip over.

Figure 8:
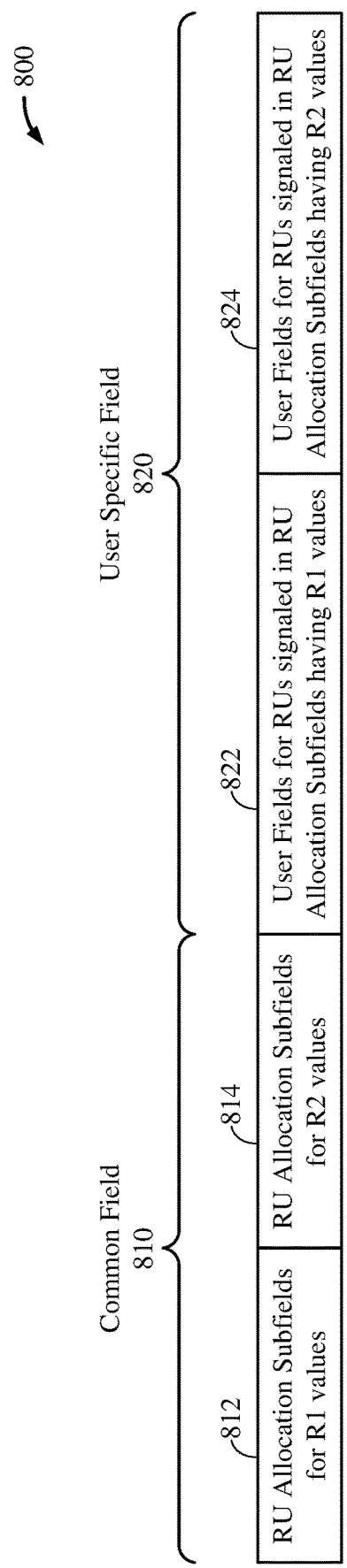
FIG. 8 shows an example non-legacy signal field of a PPDU according to some implementations.

FIG. 8 shows an example non-legacy signal field 800 of a PPDU according to some implementations. In some implementations, the non-legacy signal field 800 may be one example of EHT-SIG 618 of FIG. 6. The non-legacy signal field 800 includes a common field 810 and a user specific field 820. The common field 810 includes a first RU allocation subfield 812 and a second RU allocation subfield 814. In some implementations, the common field 810 also may include one or more fields overflowed from U-SIG (not shown for simplicity). The user specific field 820 includes a first set of user fields 822 and a second set of user fields 824. The first RU allocation subfield 812 carries RU allocation information for the first set of user fields 822 and the second RU allocation subfield 814 carries RU allocation information for the second set of user fields 824. In the example of FIG. 8, the RU allocation subfields 812 and 814 and the user fields 822 and 824 are transmitted on the same content channel. Specifically, only one content channel is depicted in the example of FIG. 8. However, in actual implementations, the non-legacy signal field 800 may be transmitted over multiple content channels.

In some implementations, the first RU allocation subfield 812 may only be set to an R1 value. However, the second RU allocation subfield 814 may be set to an R2 value. As a result, only R1 RUs may be allocated to users associated with the first set of user fields 822 whereas R2 RUs may be allocated to users associated with the second set of user fields 824. An R1 receiving device may interpret the R1 value of the first RU allocation subfield 812 and continue to receive the second RU allocation subfield 814. In some implementations, the receiving device may classify the R2 value of the second RU allocation subfield 814 as a disregard state because the user fields 824 associated with the second RU allocation subfield 814 are located at the end of the user specific field 820 and therefore does not hinder the ability of the receiving device to skip to the relevant user field. In other words, the receiving device may identify its user field among the first set of user fields 822 based on the information in the first RU allocation field 812. The receiving device may then skip to the next field or subfield in the PPDU (after the user specific field 820).

Aspects of the present disclosure recognize that the implementations described with respect to FIGS. 7 and 8 place restrictions on the design of the PPDU. In some other implementations, the PHY preamble of a PPDU may be configured to carry additional signaling to indicate the number of user fields associated with an RU allocation subfield set to an R2 value. This may loosen the restrictions on PPDU design at the transmitting device. In some aspects, the signaling may be explicit. For example, a PPDU may be configured to include a new field or subfield that carries information indicating the number of user fields associated with the R2 value (such as described with reference to FIGS. 9 and 10). In some other aspects, the signaling may be implicit. For example, the bit pattern representing the R2 value may be configured to indicate the number of user fields associated therewith (such as described with reference to FIGS. 11 and 12).

Figure 9:
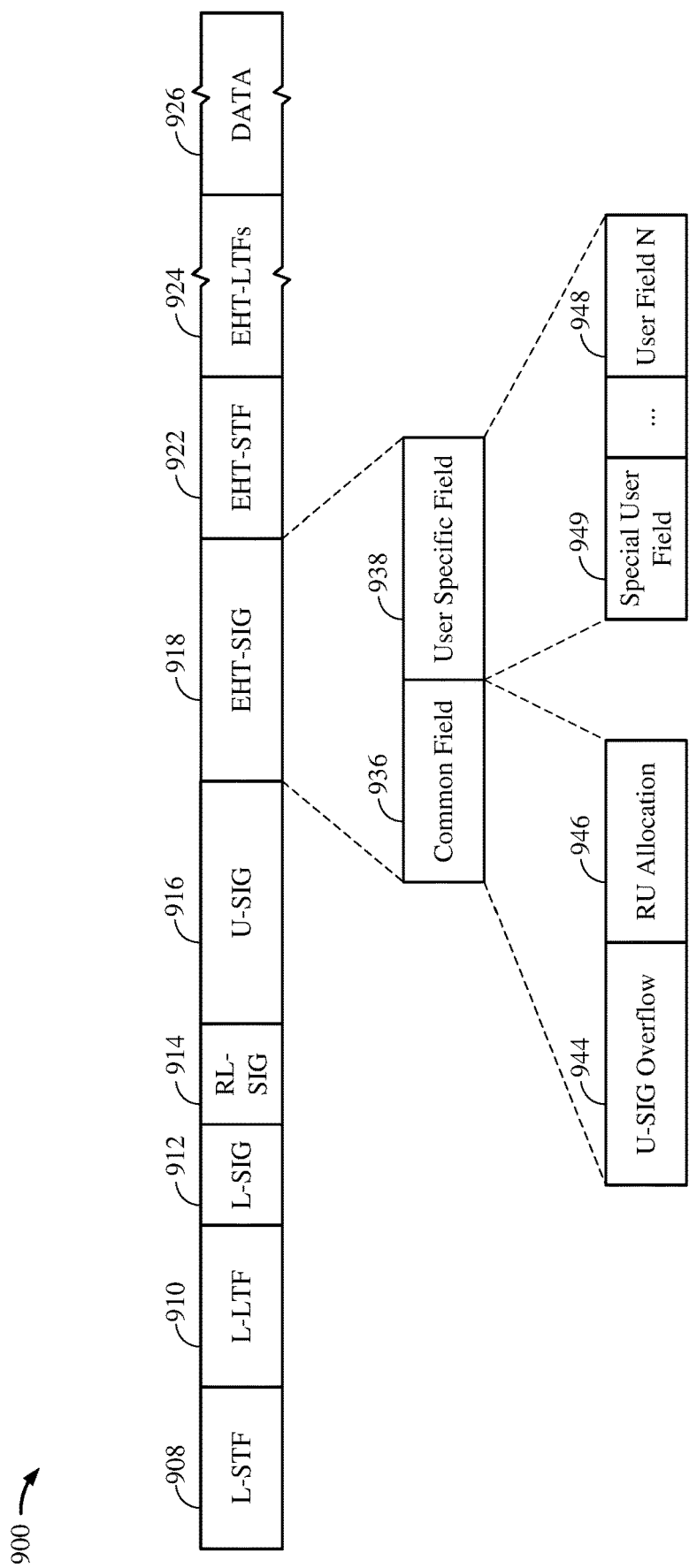
FIG. 9 shows an example PPDU usable for communications between an AP and a number of STAs according to some implementations.

FIG. 9 shows an example PPDU 900 usable for communications between an AP and a number of STAs according to some implementations. In some implementations, the PPDU 900 may be one example of PPDU 600 of FIG. 6. The PPDU 900 includes L-STF 908, L-LTF 910, L-SIG 912, RL-SIG 914, U-SIG 916, EHT-SIG 918, EHT-STF 922, EHT-LTFs 924, and a data portion 926, which may be examples of L-STF 608, L-LTF 610, L-SIG 612, RL-SIG 614, U-SIG 616, EHT-SIG 618, EHT-STF 622, EHT-LTFs 624, and the data portion 626, respectively, of FIG. 6. EHT-SIG 918 further includes a common field 936 and a user specific field 938. The common field 936 includes U-SIG overflow 944 and one or more RU allocation subfields 946. The user specific field 938 includes a number (N) of user fields 948.

In some implementations, the user specific field 938 may further include a special user field 949. The special user field 949 may be identified by a special AID value that cannot be assigned to any user associated with the user specific field 938. In some implementations, the special user field 949 may carry information indicating a number of user fields 948 associated with the RU allocation subfields 946. In some aspects, the information in the special user field 949 may only indicate the number of user fields 948 associated with one or more RU allocation subfields 946 that are set to an R2 value. In some other aspects, the information in the special user field 949 may indicate the number of user fields 948 associated with each RU allocation subfield 946 in the common field 936 (including RU allocation subfields 946 that are set to R1 values and RU allocation subfields 946 that are set to R2 values).

In some implementations, at least one of the RU allocation subfields 946 of the common field 936 may be set to an R2 value. Further, the PPDU 900 may be transmitted to an R1 receiving device. In some implementations, the receiving device may classify the R2 value of the RU allocation subfield 946 as a disregard state because the user specific field 938 includes a special user field 949. In other words, the receiving device does not need to interpret the R2 value to determine the number of user fields 948 associated with the corresponding RU allocation subfield 946. In some implementations, the receiving device may identify the special user field 949 by determining that the value of an AID subfield of the user field 949 matches the special AID value. Upon identifying the special user field 949, the receiving device may further interpret the information carried in the special user field 949 to indicate the number of user fields 948 associated with the R2 value. The receiving device may thus continue receiving the PPDU 900, for example, by skipping over the number of user fields 948 associated with the R2 value.

Figure 10:
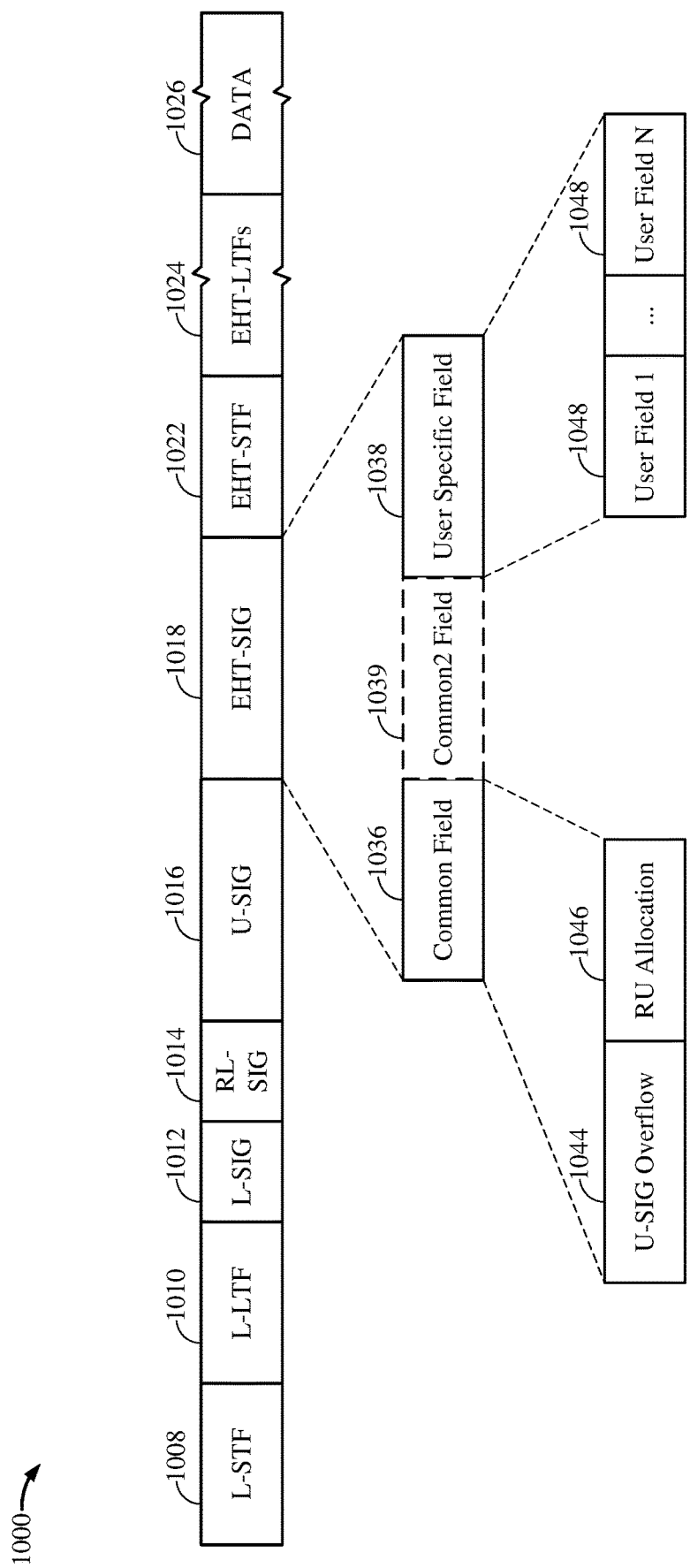
FIG. 10 shows an example PPDU usable for communications between an AP and a number of STAs according to some implementations.

FIG. 10 shows an example PPDU 1000 usable for communications between an AP and a number of STAs according to some implementations. In some implementations, the PPDU 1000 may be one example of PPDU 600 of FIG. 6. The PPDU 1000 includes L-STF 1008, L-LTF 1010, L-SIG 1012, RL-SIG 1014, U-SIG 1016, EHT-SIG 1018, EHT-STF 1022, EHT-LTFs 1024, and a data portion 1026, which may be examples of L-STF 608, L-LTF 610, L-SIG 612, RL-SIG 614, U-SIG 616, EHT-SIG 618, EHT-STF 622, EHT-LTFs 624, and the data portion 626, respectively, of FIG. 6. EHT-SIG 1018 further includes a common field 1036 and a user specific field 1038. The common field 1036 includes U-SIG overflow 1044 and one or more RU allocation subfields 1046. The user specific field 1038 includes a number (N) of user fields 1048.

In some implementations, EHT-SIG 1018 may include an additional common (common2) field 1039. The common2 field 1039 may carry information indicating a number of user fields 1048 associated with the RU allocation subfields 1046. In some implementations, the information in the common2 field 1039 may indicate the number of user fields 1048 associated with one or more RU allocation subfields 1046 set to an R2 value. Thus, the common2 field 1039 may be omitted if the PPDU 1000 does not include any RU allocation subfields 1046 that are set to R2 values. In some aspects, the size of the common2 field 1039 may be fixed. For example, the common2 field 1039 may carry 3 bits per RU allocation subfield 1046, for a total of 8 RU allocation subfields 1046 (such as for a 320 MHz bandwidth). In some other aspects, the size of the common2 field 1039 may be variable. For example, the size of the common2 field 1039 may depend on the number of RU allocation subfields 1046 that are set to R2 values.

In some implementations, at least one of the RU allocation subfields 1046 of the common field 1036 may be set to an R2 value. Further, the PPDU 1000 may be transmitted to an R1 receiving device. In some implementations, the receiving device may classify the R2 value of the RU allocation subfield 1046 as a disregard state because the PPDU 100 includes a common2 field 1039. In other words, the receiving device does not need to interpret the R2 value to determine the number of user fields 1048 associated with the corresponding RU allocation subfield 1046. In some implementations, the receiving device may detect the availability of the common2 field 1039 based on determining that at least one of the RU allocation subfields 1046 is set to a reserved value. Upon identifying the common2 field 1039, the receiving device may further interpret the information carried in the common2 field 1039 to indicate the number of user fields 1048 associated with the R2 value. The receiving device may thus continue receiving the PPDU 1000, for example, by skipping over the number of user fields 1048 associated with the R2 value.

Figure 11:
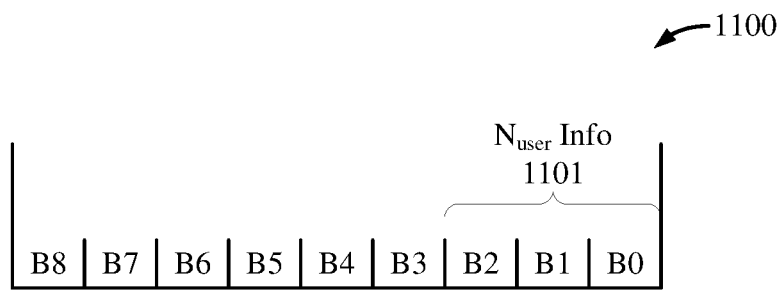
FIG. 11 shows an example format of a resource unit (RU) allocation subfield of a non-legacy signal field according to some implementations.

FIG. 11 shows an example format of an RU allocation subfield 1100 of a non-legacy signal field according to some implementations. In some implementations, the RU allocation subfield 1100 may be one example of the RU allocation subfield 646 of FIG. 6. The RU allocation subfield 1100 carries 9 bits of information (bits B0-B8). As described above, the combination of bits B0-B8 may be a binary representation of an integer value which maps to a unique allocation of RUs (or M-RUs) and a number of user fields associated with each RU (or M-RU). Some values of the RU allocation subfield 1100 (such as R2 values) may be reserved in R1, but map to unique RU or M-RU allocations in R2. In some implementations, R2 values may be designed such that the values of the last three bits B0-B2 (corresponding to the 3 least significant bits (LSBs) of the RU allocation subfield 1100) are configured to carry signaling information 1101 indicating a number of users associated with the R2 value. An example mapping of values for the last three bits B0-B2 (for R2 values) to various numbers of users ($N_{user}$) is depicted in Table 2, below.

TABLE 2

| Value (B2 B1 B0) | $N_{user}$ |
|---|---|
| 000 | 1 |
| 001 | 2 |
| 010 | 3 |
| 011 | 4 |
| 100 | 5 |
| 101 | 6 |
| 110 | 7 |
| 111 | 8 |

In some implementations, when receiving a PPDU that includes an RU allocation subfield 11000 set to an R2 value, a receiving device may classify the R2 value as a disregard state because the number of users can be determined from the last three bits B0-B2 of the RU allocation subfield 1100. More specifically, although the receiving device may not be able to interpret the R2 value, the receiving device may determine the number of users associated with the R2 value (and thus the number of user fields to skip the user specific field) based on the value of the last three bits B0-B2. For example, the receiving device may determine the number of users $N_{user}$ based on the mapping of Table 2. the receiving device may determine the this is equivalent to computing:

$N_{user}$=R2_value %8+1 where R2_value is the integer value of the RU allocation subfield 1100. The receiving device may thus continue receiving the PPDU, for example, by skipping over the number of user fields associated with the R2 value.

Figure 12:
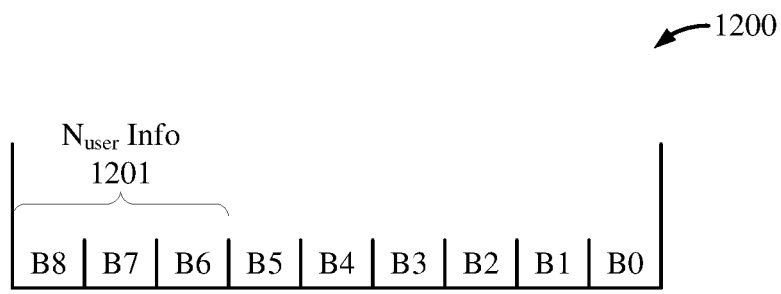
FIG. 12 shows another example format of an RU allocation subfield of a non-legacy signal field according to some implementations.

FIG. 12 shows another example format of an RU allocation subfield 1200 of a non-legacy signal field according to some implementations. In some implementations, the RU allocation subfield 1200 may be one example of the RU allocation subfield 646 of FIG. 6. The RU allocation subfield 1200 carries 9 bits of information (bits B0-B8). As described above, the combination of bits B0-B8 may be a binary representation of an integer value which maps to a unique allocation of RUs (or M-RUs) and a number of user fields associated with each RU (or M-RU). Some values of the RU allocation subfield 1200 (such as R2 values) may be reserved in R1, but map to unique RU or M-RU allocations in R2. In some implementations, R2 values may be designed such that the values of the first three bits B6-B8 (corresponding to the 3 most significant bits (MSBs) of the RU allocation subfield 1200) are configured to carry signaling information 1201 indicating a number of users associated with the R2 value. Such implementations also may require the mapping of R1 values to conform to the same design considerations. For example, the R1 values may not occupy all RU allocation subfield values beginning with "000." Table 3, below, shows an example listing of the number of users ($N_{user}$) and the number of entries (or unique values for the RU allocation subfield) in R1 that are associated with the number of users.

TABLE 3

| $N_{user}$ | # Entries |
|---|---|
| 0 | 4 |
| 1 | 30 |
| 2 | 32 |
| 3 | 35 |
| 4 | 40 |
| 5 | 40 |
| 6 | 40 |
| 7 | 38 |
| 8 | 34 |
| 9 | 1 |

In Table 3, the four entries associated with 0 users include a punctured RU242, an empty RU242, an empty RU484, and an empty RU996. An example mapping of values for the first three bits B6-B8 (for R1 values and R2 values) to various numbers of users $N_{user}$ is depicted in Table 4, below.

TABLE 4

| Value (B8 B7 B6) | $N_{user}$ |
|---|---|
| 000 | 0, 1, or 9 |
| 001 | 2 |
| 010 | 3 |
| 011 | 4 |
| 100 | 5 |
| 101 | 6 |
| 110 | 7 |
| 111 | 8 |

In some implementations, when receiving a PPDU that includes an RU allocation subfield 1200 set to an R2 value, a receiving device may classify the R2 value as a disregard state because the number of users can be determined from the first three bits B6-B8 of the RU allocation subfield 1200. More specifically, although the receiving device may not be able to interpret the R2 value, the receiving device may determine the number of users associated with the R2 value (and thus the number of user fields to skip the user specific field) based on the value of the first three bits B6-B8. For example, the receiving device may determine the number of users $N_{user}$ based on the mapping of Table 4. The receiving device may thus continue receiving the PPDU, for example, by skipping over the number of user fields associated with the R2 value.

Figure 13:
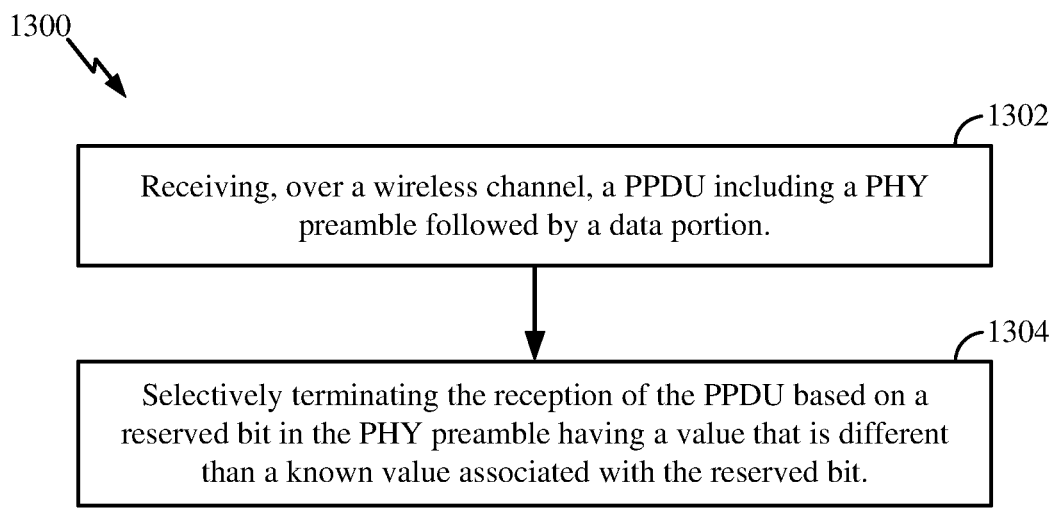
FIG. 13 shows a flowchart illustrating an example process for wireless communication that supports interpretation of reserved states in wireless packets according to some implementations.

FIG. 13 shows a flowchart illustrating an example process 1300 for wireless communication that supports interpretation of reserved states in wireless packets according to some implementations. In some implementations, the process 1300 may be performed by a wireless communication device operating as or within a STA such as one of the STAs 104 or 504 of FIGS. 1 and 5B, respectively. In some other implementations, the process 1300 may be performed by a wireless communication device operating as or within an AP such as one of the APs 102 or 502 of FIGS. 1 and 5A, respectively.

In some implementations, the process 1300 begins in block 1302 by receiving, over a wireless channel, a PPDU including a PHY preamble followed by a data portion. In some implementations, the PHY preamble may include an L-STF, an L-LTF, an L-SIG, an RL-SIG that immediately follows L-SIG, and a U-SIG that immediately follows RL-SIG and carries information for interpreting one or more subsequent fields of the PHY preamble. In block 1304, the process 1300 proceeds with selectively terminating the reception of the PPDU based on a reserved bit in the PHY preamble having a value that is different than a known value associated with the reserved bit.

In some aspects, the reception of the PPDU may be terminated based on a location of the reserved bit in the PHY preamble. In some implementations, the reserved bit may be located immediately after a punctured channel indication subfield of U-SIG, where the punctured channel indication subfield carries information indicating whether puncturing is performed on one or more subchannels of the wireless channel. In some implementations, the reserved bit may be located immediately after a PPDU type and compression mode subfield of U-SIG, where the PPDU type and compression mode subfield carries information indicating a format of the PPDU. In some implementations, U-SIG may include a plurality of version-independent fields followed by a plurality of version-dependent fields, where the reserved bit is located after the plurality of version-independent fields and before the plurality of version-dependent fields. In some implementations, the reserved bit may be located in a user field of a non-legacy signal field that follows U-SIG in the PHY preamble, where the user field includes an AID subfield. In such implementations, the reception of the PPDU may be terminated based on the AID subfield being set to an AID value assigned to the wireless communication device.

In some other aspects, the reception of the PPDU may continue based on a location of the reserved bit in the PHY preamble. In some implementations, the reserved bit may be located in a common field included in a non-legacy signal field that follows U-SIG in the PHY preamble, where the common field includes one or more version-dependent fields. In such implementations, the reserved bit may be located immediately after one of the one or more version-dependent fields. In some implementations, the reserved bit may be located in a user field of a non-legacy signal field that follows U-SIG in the PHY preamble, where the user field includes an AID subfield. In such implementations, the reception of the PPDU may be continued based on the AID subfield being set to an AID value not assigned to the wireless communication device.

Figure 14:
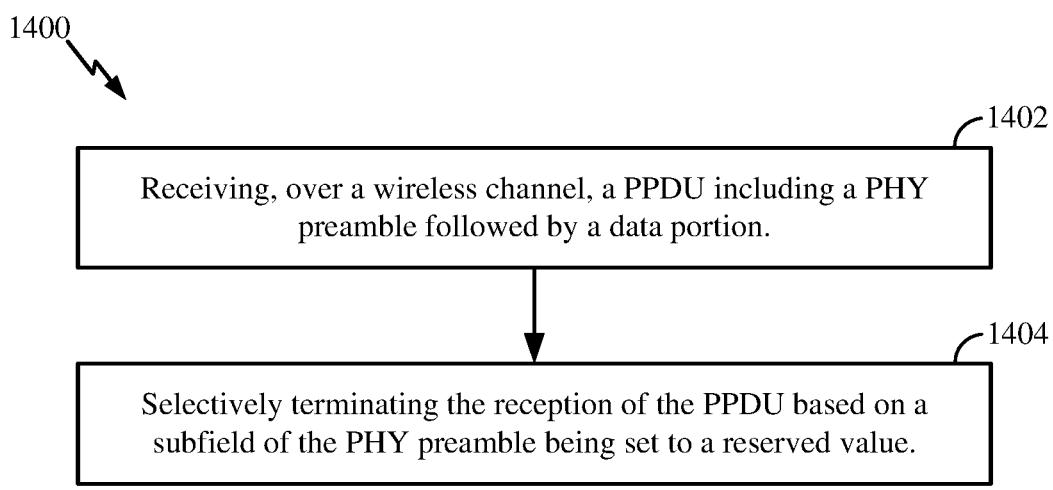
FIG. 14 shows a flowchart illustrating an example process for wireless communication that supports interpretation of reserved state in wireless packets according to some implementations.

FIG. 14 shows a flowchart illustrating an example process 1400 for wireless communication that supports interpretation of reserved state in wireless packets according to some implementations. In some implementations, the process 1400 may be performed by a wireless communication device operating as or within a STA such as one of the STAs 104 or 504 of FIGS. 1 and 5B, respectively. In some other implementations, the process 1400 may be performed by a wireless communication device operating as or within an AP such as one of the APs 102 or 502 of FIGS. 1 and 5A, respectively.

In some implementations, the process 1400 begins in block 1402 by receiving, over a wireless channel, a PPDU including a PHY preamble followed by a data portion. In some implementations, the PHY preamble may include an L-STF, an L-LTF, an L-SIG, an RL-SIG that immediately follows L-SIG, and a U-SIG that immediately follows RL-SIG and carries information for interpreting one or more subsequent fields of the PHY preamble. In block 1404, the process 1400 proceeds with selectively terminating the reception of the PPDU based on a subfield of the PHY preamble being set to a reserved value.

In some aspects, the reception of the PPDU may be terminated based on a type of information carried in the subfield. In some implementations, the subfield may be a PPDU bandwidth subfield of U-SIG that carries information indicating a bandwidth of the wireless channel. In some implementations, the subfield may be a punctured channel indication subfield of U-SIG that carries information indicating whether puncturing is performed on one or more subchannels of the wireless channel. In some implementations, the subfield may be a PPDU type and compression mode subfield of U-SIG that carries information indicating a format of the PPDU. In some implementations, the subfield may be included in a user field of a non-legacy signal field that follows U-SIG in the PHY preamble, where the reception of the PPDU is terminated based on an AID subfield of the user field being set to an AID value assigned to the wireless communication device. In such implementations, the subfield may be a spatial configuration subfield that carries information indicating a number of spatial streams allocated for a user associated with the user field.

In some implementations, the subfield may be a number of non-legacy LTF symbols subfield of a common field included in a non-legacy signal field that follows U-SIG in the PHY preamble, where the number of non-legacy LTF symbols subfield carries information indicating a number of non-legacy LTF symbols in the PPDU following the non-legacy signal field. In some implementations, the subfield may be an RU allocation subfield of a common field included in a non-legacy signal field that follows U-SIG in the PHY preamble, where the RU allocation subfield carries information indicating an allocation of RUs for one or more users associated with the user specific field.

In some other aspects, the reception of the PPDU may continue based on a type of information carried in the subfield. In some implementations, the subfield may be an RU allocation subfield of a common field included in a non-legacy signal field that follows U-SIG in the PHY preamble, where the RU allocation subfield carries information indicating an allocation of RUs for one or more users associated with the user specific field. In such implementations, a pattern of bits in the RU allocation subfield may indicate a number of user fields in the user specific field that are associated with the RU allocation subfield. In some implementations, the subfield may be included in a user field of a non-legacy signal field that follows U-SIG in the PHY preamble, where the reception of the PPDU is terminated based on an AID subfield of the user field being set to an AID value assigned to the wireless communication device. In such implementations, the subfield may be a spatial configuration subfield of the user field that carries information indicating a number of spatial streams allocated for a user associated with the user field.

Figure 15:
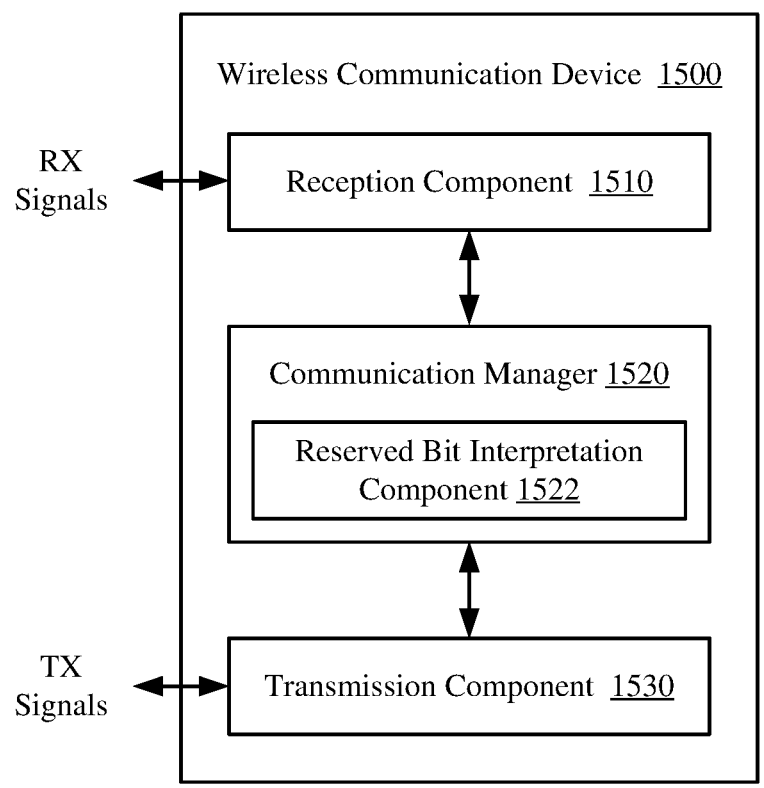
FIG. 15 shows a block diagram of an example wireless communication device according to some implementations.

FIG. 15 shows a block diagram of an example wireless communication device 1500 according to some implementations. In some implementations, the wireless communication device 1500 is configured to perform the process 1300 described above with reference to FIG. 13. In some implementations, the wireless communication device 1500 can be an example implementation of the wireless communication device 400 described above with reference to FIG. 4. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 may further include a reserved bit interpretation component 1522. Portions of the reserved bit interpretation component 1522 may be implemented at least in part in hardware or firmware. In some implementations, the reserved bit interpretation component 1522 is implemented at least in part as software stored in a memory (such as the memory 408). For example, portions of the reserved bit interpretation component 1522 can be implemented as non-transitory instructions or code executable by a processor (such as the processor 406) to perform the functions or operations of the respective component.

The reception component 1510 is configured to receive RX signals from another wireless communication device. In some implementations, the RX signals may represent a PPDU including a physical layer preamble followed by a data portion. The communication manager 1520 is configured to manage wireless communications with other wireless communication devices. In some implementations, the reserved bit interpretation component 1522 selectively terminates the reception of the PPDU based on a reserved bit in the PHY preamble having a value that is different than a known value associated with the reserved bit. The transmission component 1530 is configured to transmit TX signals to other wireless communication devices.

Figure 16:
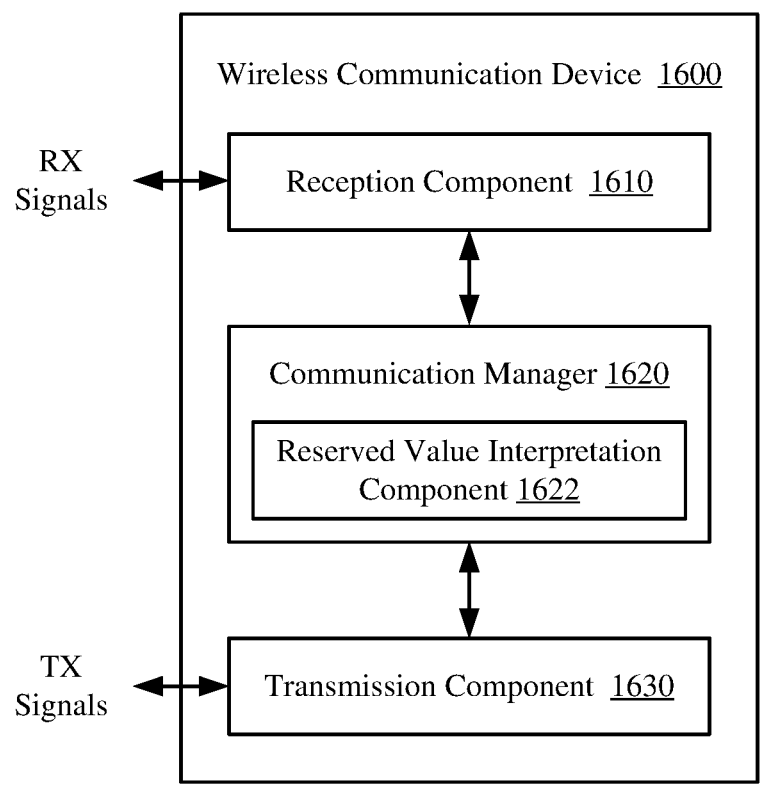
FIG. 16 shows a block diagram of an example wireless communication device according to some implementations.

FIG. 16 shows a block diagram of an example wireless communication device 1600 according to some implementations. In some implementations, the wireless communication device 1600 is configured to perform the process 1400 described above with reference to FIG. 14. In some implementations, the wireless communication device 1600 can be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 may further include a reserved value interpretation component 1622. Portions of the reserved value interpretation component 1622 may be implemented at least in part in hardware or firmware. In some implementations, the reserved value interpretation component 1622 is implemented at least in part as software stored in a memory (such as the memory 408). For example, portions of the reserved value interpretation component 1622 can be implemented as non-transitory instructions or code executable by a processor (such as the processor 406) to perform the functions or operations of the respective component.

The reception component 1610 is configured to receive RX signals from another wireless communication device. In some implementations, the RX signals may represent a PPDU including a physical layer preamble followed by a data portion. The communication manager 1620 is configured to manage wireless communications with other wireless communication devices. In some implementations, the reserved value interpretation component 1622 selectively terminates the reception of the PPDU based on a subfield of the PHY preamble being set to a reserved value. The transmission component 1630 is configured to transmit TX signals to other wireless communication devices.

Implementation examples are described in the following numbered clauses:

1. A method for wireless communication by a wireless communication device, including:
   receiving, over a wireless channel, a physical layer convergence protocol (PLCP) protocol data unit (PPDU) including a physical layer (PHY) preamble followed by a data portion; and
   selectively terminating the reception of the PPDU based on a reserved bit in the PHY preamble having a value that is different than a known value associated with the reserved bit.
2. The method of clause 1, where the PHY preamble includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.
3. The method of any of clauses 1 or 2, where the selective terminating of the reception of the PPDU includes:
   terminating the reception of the PPDU based on a location of the reserved bit in the PHY preamble.
4. The method of any of clauses 1-3, where the reserved bit is located immediately after a punctured channel indication subfield of U-SIG, the punctured channel indication subfield carrying information indicating whether puncturing is performed on one or more sub-channels of the wireless channel.
5. The method of any of clauses 1-3, where the reserved bit is located immediately after a PPDU type and compression mode subfield of U-SIG, the PPDU type and compression mode subfield carrying information indicating a format of the PPDU.
6. The method of any of clauses 1-3, where U-SIG includes a plurality of version-independent fields followed by a plurality of version-dependent fields, the reserved bit being located after the plurality of version-independent fields and before the plurality of version-dependent fields.
7. The method of any of clauses 1-3, where the reserved bit is located in a user field of a non-legacy signal field that follows U-SIG in the PHY preamble, the user field including an association identifier (AID) subfield.
8. The method of any of clauses 1-3 or 7, where the reception of the PPDU is terminated based on the AID subfield being set to an AID value assigned to the wireless communication device.
9. The method of any of clauses 1 or 2, where the selective terminating of the reception of the PPDU includes:
   continuing the reception of the PPDU based on a location of the reserved bit in the PHY preamble.
10. The method of any of clauses 1, 2, or 9, where the reserved bit is located in a common field included in a non-legacy signal field that follows U-SIG in the PHY preamble, the common field including one or more version-dependent fields.
11. The method of any of clauses 1, 2, 9, or 10, where the reserved bit is located immediately after one of the one or more version-dependent fields.
12. The method of any of clauses 1, 2, or 9, where the reserved bit is located in a user field of a non-legacy signal field that follows U-SIG in the PHY preamble, the user field including an AID subfield.
13. The method of any of clauses 1, 2, 9, or 12, where the reception of the PPDU is continued based on the AID subfield being set to an AID value not assigned to the wireless communication device.
14. A wireless communication device including:
    at least one processor; and at least one memory communicatively coupled with the at least one processor and storing processor-readable code that, when executed by the at least one processor, is configured to perform the method of any one or more of clauses 1-13.

15. A method for wireless communication by a wireless communication device, including:
receiving, over a wireless channel, a physical layer convergence protocol (PLCP) protocol data unit (PPDU) including a physical layer (PHY) preamble followed by a data portion; and
selectively terminating the reception of the PPDU based on a subfield of the PHY preamble being set to a reserved value.

16. The method of clause 15, where the PHY preamble includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and carries information for interpreting one or more subsequent fields of the PHY preamble.

17. The method of any of clauses 15 or 16, where the selective terminating of the reception of the PPDU includes:
terminating the reception of the PPDU based on a type of information carried in the subfield.

18. The method of any of clauses 15, 16, or 17, where the subfield is a PPDU bandwidth subfield of U-SIG that carries information indicating a bandwidth of the wireless channel.

19. The method of any of clauses 15, 16, or 17, where the subfield is a punctured channel indication subfield of U-SIG that carries information indicating whether puncturing is performed on one or more subchannels of the wireless channel.

20. The method of any of clauses 15, 16, or 17, where the subfield is a PPDU type and compression mode subfield of U-SIG that carries information indicating a format of the PPDU.

21. The method of any of clauses 15, 16, or 17, where the subfield is included in a user field of a non-legacy signal field that follows U-SIG in the PHY preamble, the reception of the PPDU being terminated based on an AID subfield of the user field being set to an AID value assigned to the wireless communication device.

22. The method of any of clauses 15, 16, 17, or 21, where the subfield is a spatial configuration subfield that carries information indicating a number of spatial streams allocated for a user associated with the user field.

23. The method of any of clauses 15, 16, or 17, where the subfield is a number of non-legacy long training field (LTF) symbols subfield of a common field included in a non-legacy signal field that follows U-SIG in the PHY preamble, the number of non-legacy LTF symbols subfield carrying information indicating a number of non-legacy LTF symbols in the PPDU following the non-legacy signal field.

24. The method of any of clauses 15, 16, or 17, where the subfield is a resource unit (RU) allocation subfield of a common field included in a non-legacy signal field that follows U-SIG in the PHY preamble, the RU allocation subfield carrying information indicating an allocation of RUs for one or more users associated with the user specific field.

25. The method of any of clauses 15 or 16, where the selective terminating of the reception of the PPDU includes:
continuing the reception of the PPDU based on a type of information carried in the subfield.

26. The method of any of clauses 15, 16, or 25, where the subfield is an RU allocation subfield of a common field included in a non-legacy signal field that follows U-SIG in the PHY preamble, the RU allocation subfield carrying information indicating an allocation of RUs for one or more users associated with the user specific field.

27. The method of any of clauses 15, 16, 25, or 26, wherein a pattern of bits in the RU allocation subfield indicates a number of user fields in the user specific field that are associated with the RU allocation subfield.

28. The method of any of clauses 15, 16, or 25, where the subfield is included in a user field of a non-legacy signal field that follows U-SIG in the PHY preamble, the reception of the PPDU being terminated based on an AID subfield of the user field being set to an AID value assigned to the wireless communication device.

29. The method of any of clauses 15, 16, 25, or 28, where the subfield is a spatial configuration subfield of the user field that carries information indicating a number of spatial streams allocated for a user associated with the user field.

30. A wireless communication device including:
at least one processor; and
at least one memory communicatively coupled with the at least one processor and storing processor-readable code that, when executed by the at least one processor, is configured to perform the method of any one or more of clauses 15-29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
   receiving, over a wireless channel, a physical layer protocol data unit (PPDU) including a physical layer (PHY) preamble followed by a data portion, the PHY preamble including a legacy short training field (L-STF), a legacy long training field (L-LTF), a legacy signal field (L-SIG), a repeat of L-SIG (RL-SIG) that immediately follows the L-SIG, and a universal signal field (U-SIG) that immediately follows the RL-SIG and that carries information for interpreting one or more subsequent fields, the PHY preamble including multiple reserved bits or fields including:
   one or more validate bits or fields; and
   one or more disregard bits or fields; and
   selectively terminating the reception of the PPDU based on the multiple reserved bits or fields, the selective termination including:
   terminating the reception of the PPDU based on at least one validate bit or field of the one or more validate bits or fields being not set to a specified value for the respective validate bit or field; or
   continuing or terminating the reception of the PPDU independent of whether at least one disregard bit or field of the one or more disregard bits or fields is not set to a specified value for the respective disregard bit or field.

2. The method of claim 1, wherein a location of each bit of the multiple reserved bits indicates whether the respective bit is a validate bit or a disregard bit.

3. The method of claim 1, wherein at least one validate bit of the multiple reserved bits is located immediately after a punctured channel indication subfield of U-SIG, the punctured channel indication subfield carrying information indicating whether puncturing is performed on one or more subchannels of the wireless channel.

4. The method of claim 1, wherein at least one validate bit of the multiple reserved bits is located immediately after a PPDU type and compression mode subfield of U-SIG, the PPDU type and compression mode subfield carrying information indicating a format of the PPDU.

5. The method of claim 1, wherein U-SIG includes a plurality of version-independent fields followed by a plurality of version-dependent fields, at least one validate bit of the multiple reserved bits being located after the plurality of version-independent fields and before the plurality of version-dependent fields.

6. The method of claim 1, wherein the PHY preamble further includes a non-legacy signal field that follows U-SIG, and wherein at least one validate bit of the multiple reserved bits is located in a user field of the non-legacy signal field, the user field including an association identifier (AID) subfield.

7. The method of claim 6, wherein the reception of the PPDU is terminated based on the AID subfield being set to an AID value assigned to the wireless communication device.

8. The method of claim 1, wherein the PHY preamble further includes a non-legacy signal field that follows U-SIG, and wherein at least one disregard bit of the multiple reserved bits is located in a common field included in the non-legacy signal field, the common field including one or more version-dependent fields.

9. The method of claim 8, wherein the at least one disregard bit is located immediately after one of the one or more version-dependent fields.

10. The method of claim 1, wherein the PHY preamble further includes a non-legacy signal field that follows U-SIG, and wherein at least one disregard bit of the multiple reserved bits is located in a user field of the non-legacy signal field, the user field including an AID subfield.

11. The method of claim 10, wherein the reception of the PPDU is continued based on the AID subfield being set to an AID value not assigned to the wireless communication device.

12. The method of claim 1, wherein a type of information carried in each field of the multiple reserved fields indicates whether the respective field is a validate field or a disregard field.

13. The method of claim 1, wherein at least one validate field of the multiple reserved fields is a PPDU bandwidth subfield of U-SIG that carries information indicating a bandwidth of the wireless channel.

14. The method of claim 1, wherein at least one validate field of the multiple reserved fields is a punctured channel indication subfield of U-SIG that carries information indicating whether puncturing is performed on one or more subchannels of the wireless channel.

15. The method of claim 1, wherein at least one validate field of the multiple reserved fields is a PPDU type and compression mode subfield of U-SIG that carries information indicating a format of the PPDU.

16. The method of claim 1, wherein the PHY preamble further includes a non-legacy signal field that follows U-SIG, and wherein at least one validate field of the multiple reserved fields is included in a user field of the non-legacy signal field, the reception of the PPDU being terminated based on an AID subfield of the user field being set to an AID value assigned to the wireless communication device.

17. The method of claim 16, wherein the at least one validate field is a spatial configuration subfield that carries information indicating a number of spatial streams allocated for a user associated with the user field.

18. The method of claim 1, wherein the PHY preamble further includes a non-legacy signal field that follows U-SIG, and wherein at least one validate field of the multiple reserved fields is a number of non-legacy long training field (LTF) symbols subfield of a common field included in the non-legacy signal field, the number of non-legacy LTF symbols subfield carrying information indicating a number of non-legacy LTF symbols in the PPDU following the non-legacy signal field.

19. The method of claim 1, wherein the PHY preamble further includes a non-legacy signal field that follows U-SIG, and wherein at least one validate field of the multiple reserved fields is a resource unit (RU) allocation subfield of a common field included in the non-legacy signal field, the RU allocation subfield carrying information indicating an allocation of RUs for one or more users associated with a user specific field.

20. The method of claim 1, wherein the PHY preamble further includes a non-legacy signal field that follows U-SIG, and wherein at least one disregard field of the multiple reserved fields is an RU allocation subfield of a common field included in the non-legacy signal field, the RU allocation subfield carrying information indicating an allocation of RUs for one or more users associated with a user specific field.

21. The method of claim 20, wherein a pattern of bits in the RU allocation subfield indicates a number of user fields in the user specific field that are associated with the RU allocation subfield.

22. The method of claim 1, wherein the PHY preamble further includes a non-legacy signal field that follows U-SIG, and wherein at least one disregard field of the multiple reserved fields is included in a user field of the non-legacy signal field.

23. The method of claim 22, wherein the at least one disregard field is a spatial configuration subfield of the user field that carries information indicating a number of spatial streams allocated for a user associated with the user field.

24. The method of claim 1, wherein the one or more validate bits or fields include information to be used by another type of wireless communication device to interpret another field of the PHY preamble.

25. The method of claim 1, wherein the one or more disregard bits or fields include information that is not necessary for another type of wireless communication device to interpret another field of the PHY preamble.

26. The method of claim 1, wherein terminating the reception of the PPDU based on at least one of the one or more validate bits or fields being not set to the specified value for the respective validate bit or field comprises terminating the reception of the PPDU based on at least one validate field being set to a validate value that is not one of a plurality of specified values for the validate field.

27. The method of claim 26, wherein the validate value is a reserved value.

28. The method of claim 1, wherein continuing or terminating the reception of the PPDU independent of whether at least one of the one or more disregard bits or fields is not set to the specified value for the respective disregard bit or field comprises ignoring at least one disregard field that is set to a disregard value that is not one of a plurality of specified values for the disregard field.

29. The method of claim 28, wherein the disregard value is a reserved value.

30. A wireless communication device comprising:
at least one processor; and
at least one memory communicatively coupled with the at least one processor and storing processor-readable code that, when executed by the at least one processor, is configured to:
receive, over a wireless channel, a physical layer protocol data unit (PPDU) including a physical layer (PHY) preamble followed by a data portion, the PHY preamble including a legacy short training field (L-STF), a legacy long training field (L-LTF), a legacy signal field (L-SIG), a repeat of L-SIG (RL-SIG) that immediately follows the L-SIG, and a universal signal field (U-SIG) that immediately follows the RL-SIG and that carries information for interpreting one or more subsequent fields, the PHY preamble including multiple reserved bits or fields including:
one or more validate bits or fields; and
one or more disregard bits or fields; and
selectively terminate the reception of the PPDU based on the multiple reserved bits or fields, the selective termination including:
terminating the reception of the PPDU based on at least one validate bit or field of the one or more validate bits or fields being not set to a specified value for the respective validate bit or field; or
continuing or terminating the reception of the PPDU independent of whether at least one disregard bit or field of the one or more disregard bits or fields is not set to a specified value for the respective disregard bit or field.

* * * * *